June 29, 1965  J. G. WILLIAMS  3,192,000
FORCE BALANCE HYDROSTATIC-HYDRODYNAMIC THRUST BEARING
Filed May 10, 1963  11 Sheets-Sheet 1

JOHN G. WILLIAMS
INVENTOR.

BY Daniel H. Bobis
Atty.

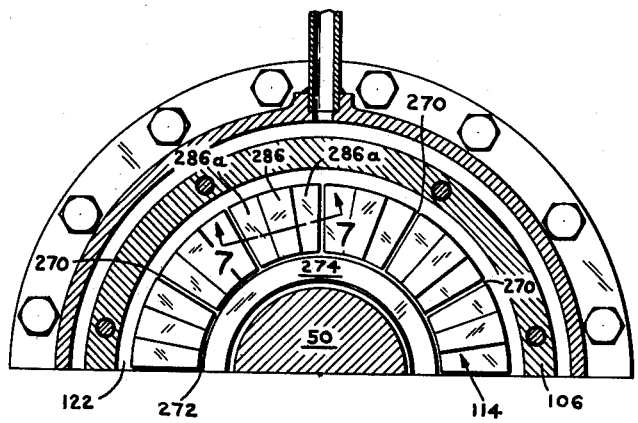
FIG. 6
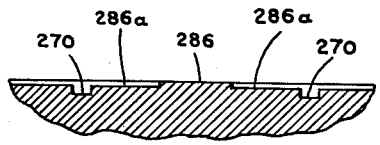
FIG. 7
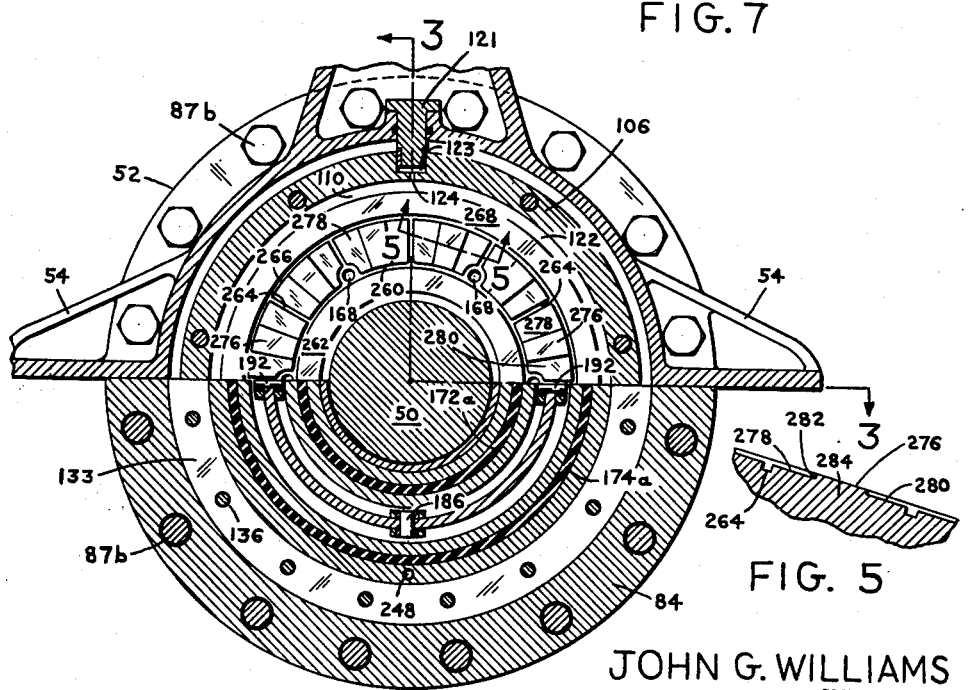
FIG. 5
FIG. 4
JOHN G. WILLIAMS
*INVENTOR.*
BY Daniel R. Bohr
*Atty*

JOHN G. WILLIAMS
*INVENTOR.*

JOHN G. WILLIAMS
INVENTOR.

June 29, 1965     J. G. WILLIAMS     3,192,000
FORCE BALANCE HYDROSTATIC-HYDRODYNAMIC THRUST BEARING
Filed May 10, 1963     11 Sheets-Sheet 5
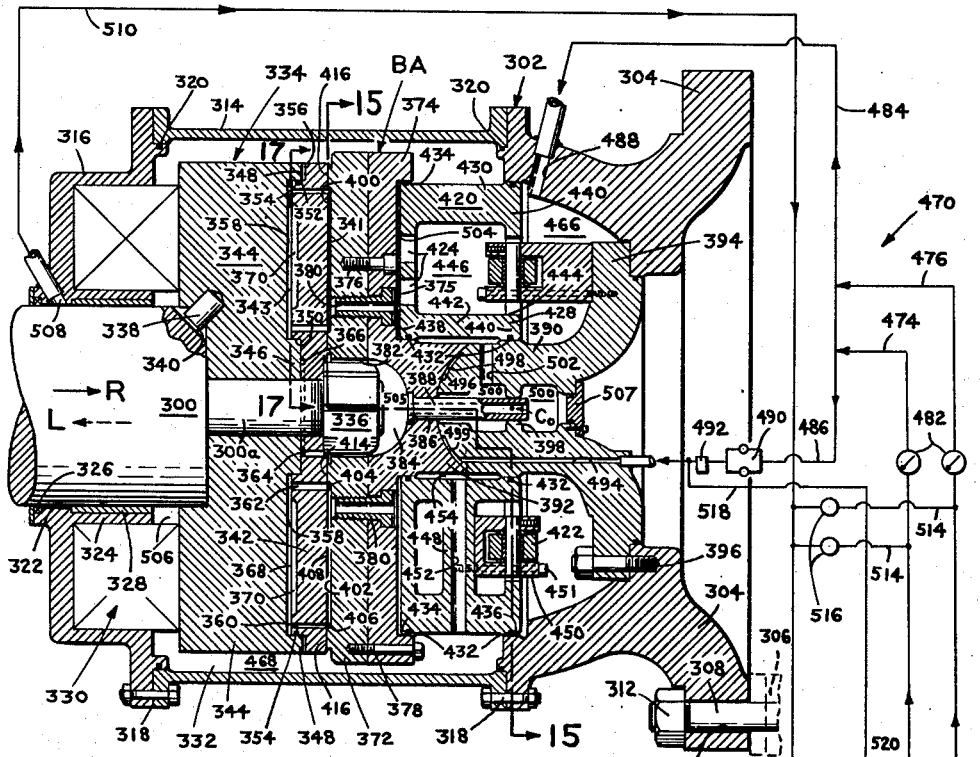
FIG. 14
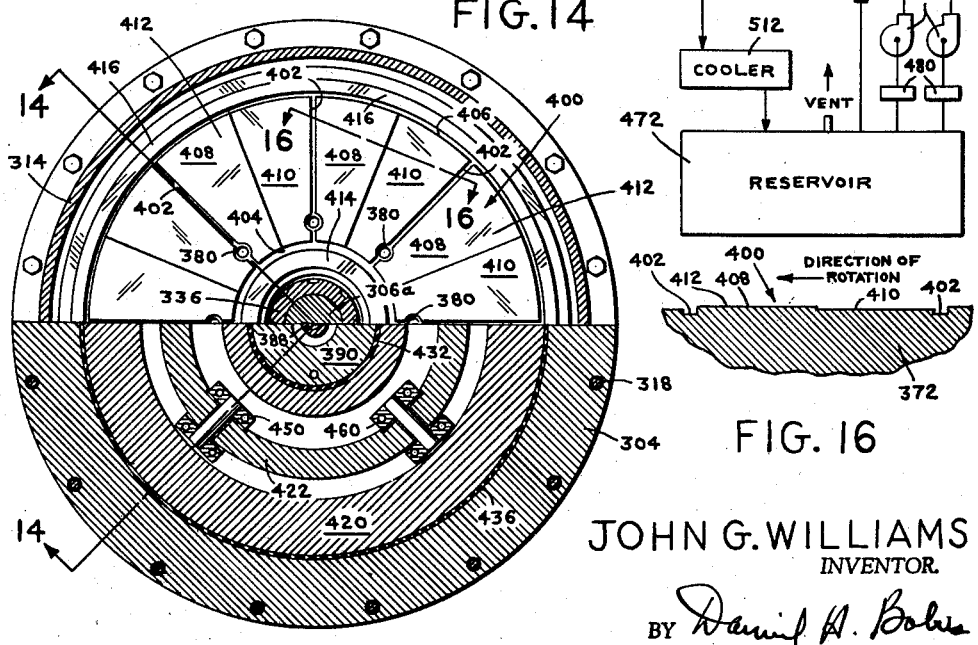
FIG. 15
FIG. 16
JOHN G. WILLIAMS
INVENTOR.

June 29, 1965 J. G. WILLIAMS 3,192,000
FORCE BALANCE HYDROSTATIC-HYDRODYNAMIC THRUST BEARING
Filed May 10, 1963 11 Sheets-Sheet 7

JOHN G. WILLIAMS
*INVENTOR.*
BY Daniel H. Bobis
*Atty*

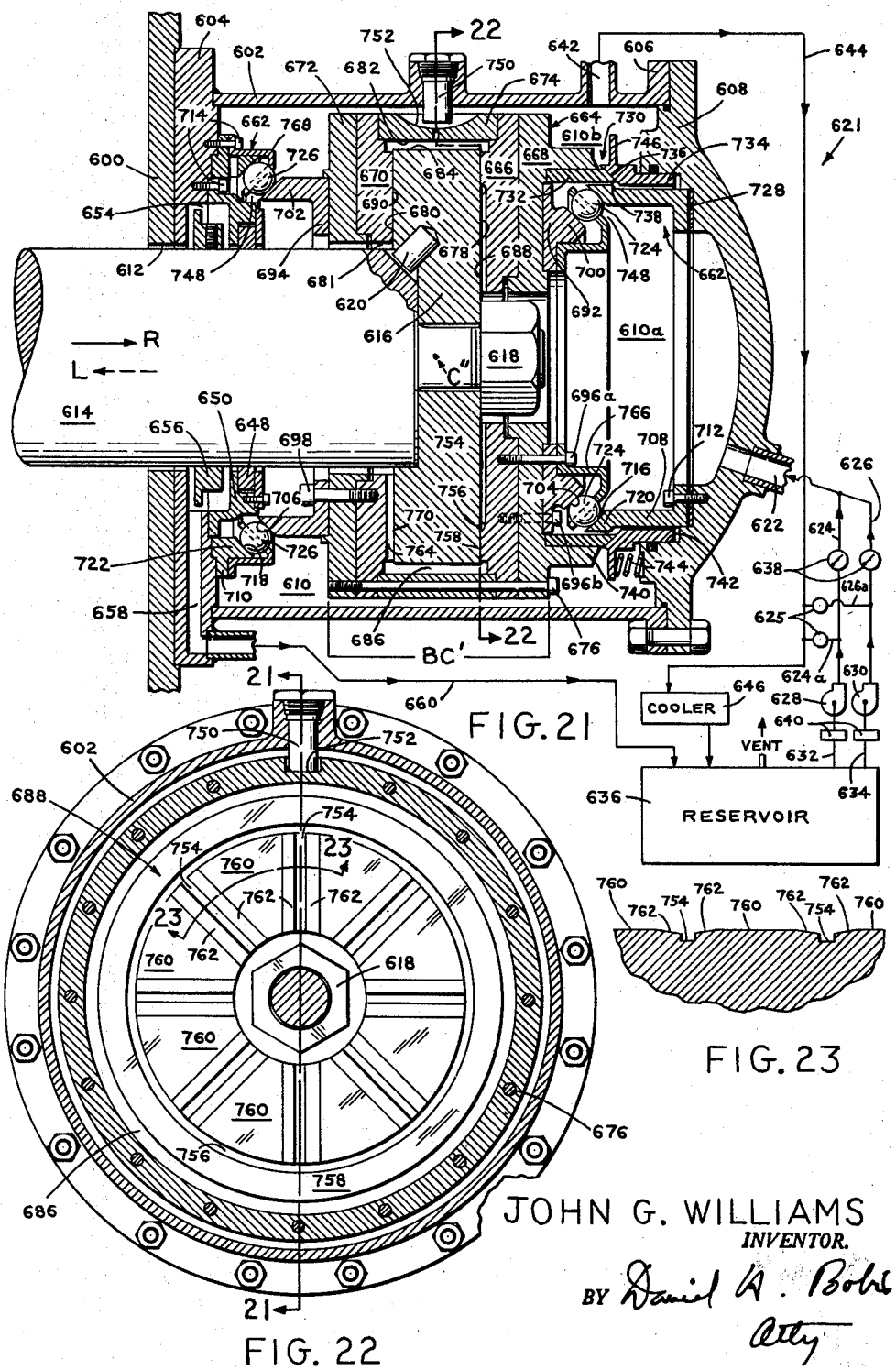

JOHN G. WILLIAMS
*INVENTOR.*

June 29, 1965  J. G. WILLIAMS  3,192,000
FORCE BALANCE HYDROSTATIC-HYDRODYNAMIC THRUST BEARING
Filed May 10, 1963  11 Sheets-Sheet 10

JOHN G. WILLIAMS
INVENTOR.

BY Daniel H. Bobis
Atty

JOHN G. WILLIAMS
INVENTOR.

United States Patent Office 3,192,000
Patented June 29, 1965

3,192,000
FORCE BALANCE HYDROSTATIC-HYDRO-
DYNAMIC THRUST BEARING
John G. Williams, Warren Township, Somerset County,
N.J. (Lindberg Ave., Plainfield, N.J.)
Filed May 10, 1963, Ser. No. 279,383
21 Claims. (Cl. 308—9)

This invention relates generally to a thrust bearing. More particularly the invention relates to a force balance hydrostatic-hydrodynamic thrust bearing.

In thrust bearings exposed to variable thrust in either direction where the net bearing load exerted on the bearing is high, several problems arise as follows:

(1) In many applications the thrust bearing must support the shaft for long periods at a stationary position and still enable the shaft to rotate in either direction using a minimal amount of starting torque.

(2) Under many conditions of use shaft deflection from strain effects of various origin will cause realignment of the shaft and the bearing support structure for the shaft, the net result of which will be relatively large and unpredictable angular and/or linear deviations from the desired parallelism between the position of the bearing thrust collar and the adjacent coacting stationary bearing surface.

(3) Due to the combined effect of variable thrust loads and change in thrust bearing collar position impact loads transmitted by adjacent parts of the bearing may produce objectionable noise for many applications especially where the speed is low and the load is large.

(4) The high bearing loads may cause distortion of the coacting thrust member faces thus seriously limiting the life of such components.

Outside of the field of anti-friction bearings the prior art shows that there are two general types of thrust bearings now in use for meeting these problems, i.e., hydrodynamic and hydrostatic.

Hydrodynamic bearings are attractive in that no external high pressure pump is required to provide an adequate oil film thickness between the rotatable thrust collar and the stationary elements of the bearing. However, bearings of this type are generally undesirable for applications where there may be high and constant static loads under intermittent operating conditions which may be at variable speeds between maximum speed in the one direction of rotation and maximum speed in the other direction of rotation. This is so because motion is requried to create a hydrodynamic film and the bearings if exposed to very large and constant static load may be unable to create this film especially after being stationary for some time.

Hydrostatic bearings technically are superior for supporting constant or variable loads for a wide range of speed and also in many instances at constant speeds. Two general forms of hydrostatic thrust bearings are the "step" type and the "multiple pocket wtih metering orifice" type.

The "step" bearing which also includes "the tapered land" type, is attractive because of its simplicity. However, it is sensitive to non-parallelism between the rotatable thrust collar and the coacting stationary elements of the thrust bearing. Thus in application where the net bearing load exerted on the bearing is high and distortion of bearing supporting members or the shaft itself is a distinct possibility, it can be used only if exceedingly large pump capacity is provided to guarantee an adequate fluid film thickness between the bearing parts taking the thrust load which pump capacity adversely affects the overall efficiency of the bearing.

The "multiple pocket with metering orifice" type conversely is relatively complex, is not efficient and furthermore is sensitive to dirt which may cause clogging of the various metering orifices the consequences of which will be immediate failure of the bearing from heavy and sustained contact between the rotatable and stationary parts of the thrust bearing.

Accordingly, it is an object of the present invention to combine the advantages while avoiding the disadvantages of the hydrodynamic and hydrostatic thrust bearings to provide an improved thrust bearing employing a force balance principle to prevent significant distortion of the bearing surfaces receiving the thrust load; to generate hydrostatic and hydrodynamic restoring moments on the full 360 degree circumferential area of the coacting bearing surfaces so as to achieve virtually constant parallelism between the rotating elements and stationary elements of the thrust bearing; which thrust bearing can accommodate a wide range of thrust loads over an equally wide range of speeds within a minimum amount of space, consume less power and weigh relatively less than other types of thrust bearings operating under similar conditions.

Another object of the present invention is to provide an improved thrust bearing which will operate with substantially little or virtually no noise; which will balance the net bearing load on either or both the stationary elements and the rotating elements of the improved thrust bearing; which will balance the net bearing load between the rotating element and stationary element of the improved thrust bearing and transmit the thrust forces causing distortion to a non-critical member of the assembly.

Other objects and advantages will be apparent from the following description of several embodiments of the invention and the novel features will be particularly pointed out hereinafter in the claims.

In the drawings:

FIGURE 4 is a cross-section taken on line 4—4 of FIGURE 3.

FIGURE 5 is a cross-section taken on line 5—5 of FIGURE 4.

FIGURE 6 is a cross-section taken on line 6—6 of FIGURE 3.

FIGURE 7 is a cross-section taken on line 7—7 of FIGURE 6.

FIGURE 14 is a section taken on line 14—14 of FIGURE 15 and showing diagrammatically an associated Kingsbury bearing and the associated pumping arrangement for the lubricating or bearing fluid.

FIGURE 15 is a cross-section taken on line 15—15 of FIGURE 14.

FIGURE 16 is a cross-section taken on line 16—16 of FIGURE 15.

Figure 19:
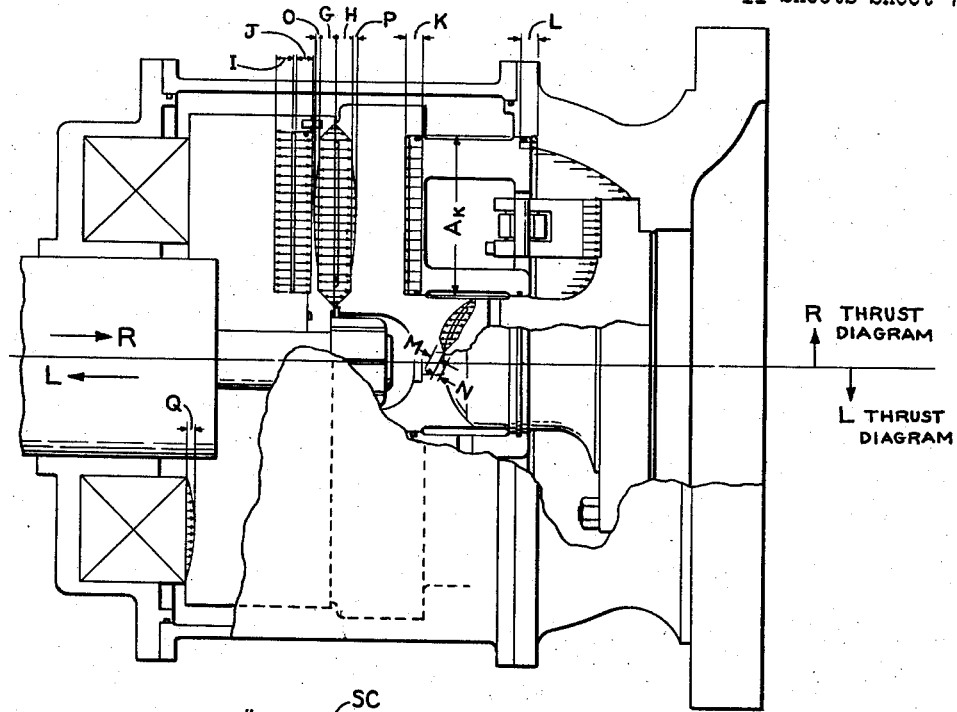

FIGURE 19 is a two-part diagrammatic sketch showing a forced diagram of typical pressures acting across the bearing plate areas for the bearing shown in FIGURE 14 and in which the upper part shows the diagrammatic pressures over areas to counteract force R and the lower part shows the diagrammatic pressures over areas to counteract force R and the lower part shows the diagrammatic pressures over areas to counteract force L.

Figure 20:
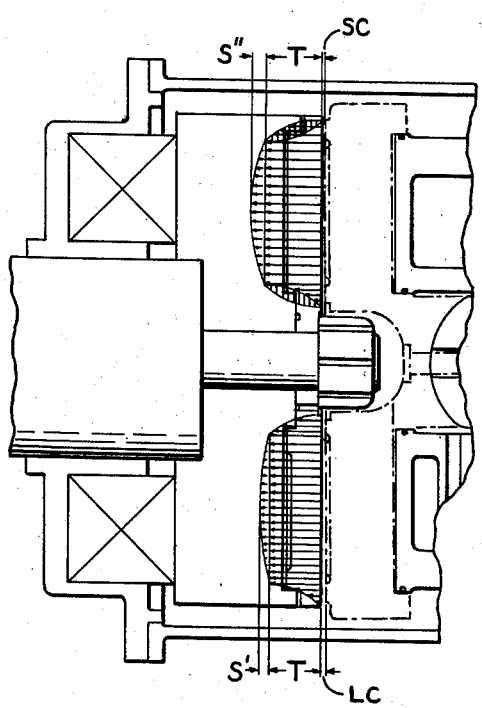

FIGURE 20 is a diagrammatic sketch showing a force diagram for non-parallelism between bearing and collar forces.

FIGURE 21 is a cross-section taken on line 21—21 of FIGURE 22 and showing diagrammatically the associated pumping arrangement for the lubricating or bearing fluid.

FIGURE 22 is a cross-section taken on line 22—22 of FIGURE 21.

FIGURE 23 is a cross-section taken on line 23—23 of FIGURE 22.

Figure 24:
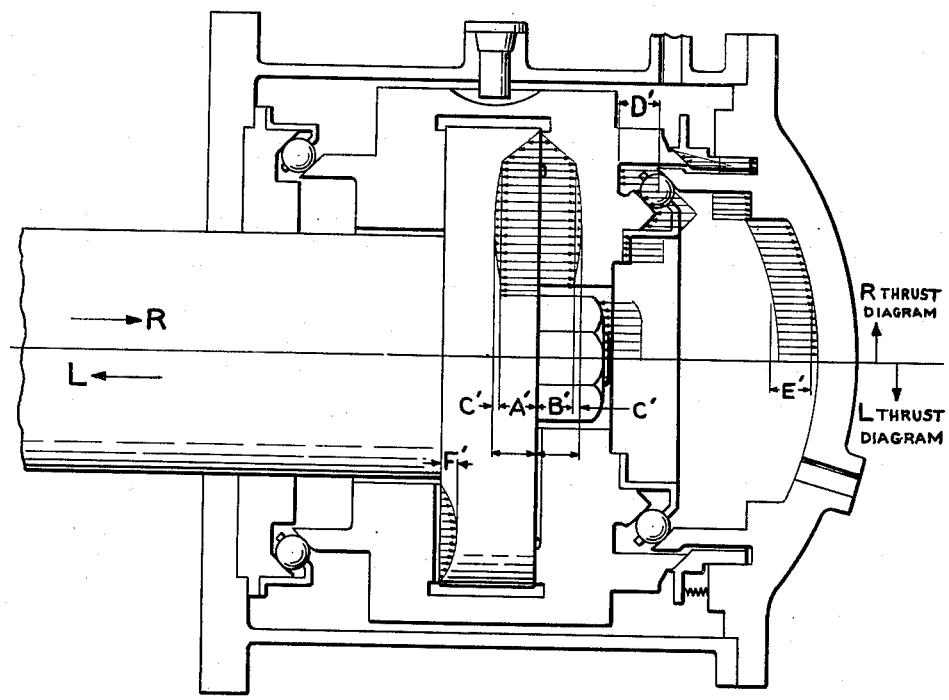

FIGURE 24 is a two-part diagrammatic sketch showing a force diagram of typical forces acting across the bearing plate for the bearing shown in FIGURE 21 and in which the upper part shows diagrammatic pressures over areas to counteract force R and the lower part shows diagrammatic pressures over areas to counteract force L.

Figure 25:
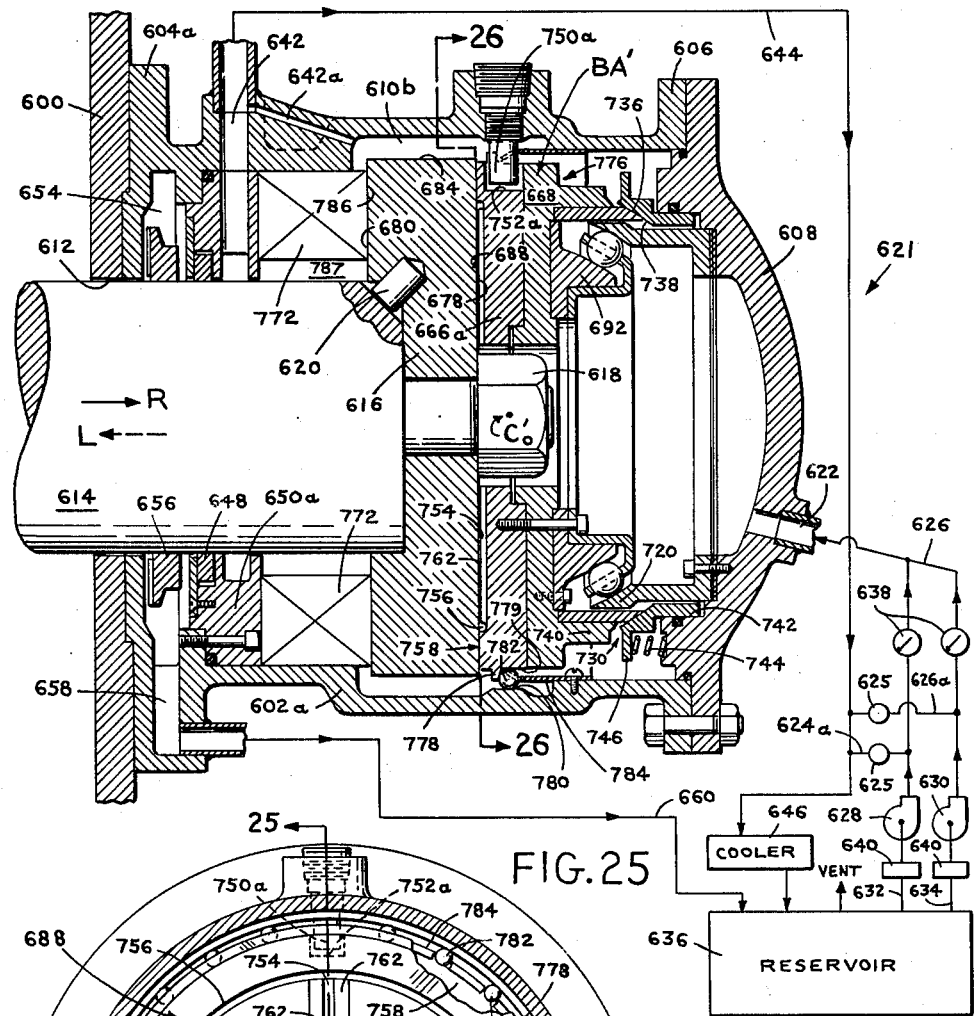
Figure 26:
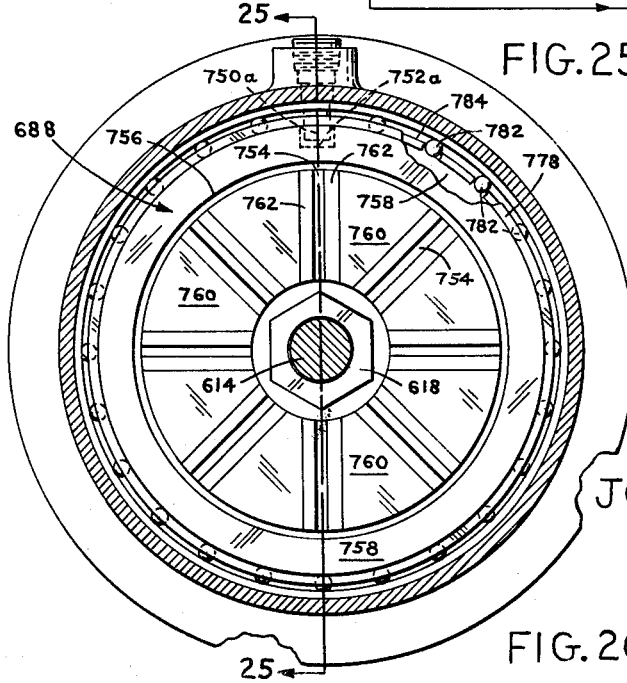

FIGURE 25 is a cross-section taken on line 25—25 of FIGURE 26 and showing diagrammatically an associated Kingsbury type bearing and the associated pumping arrangement for the lubricating or bearing fluid.

FIGURE 26 is a view taken on line 26—26 of FIGURE 25.

Figure 27:
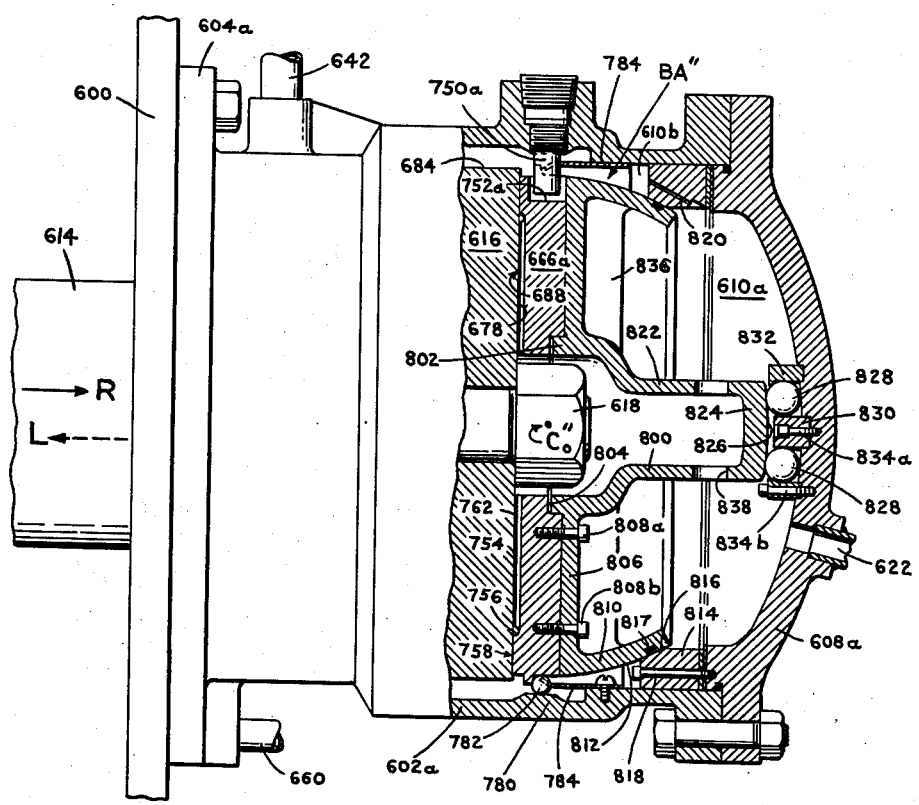

FIGURE 27 is a cross-sectional view showing another form of the construction of FIGURE 25.

In the embodiment of the invention illustrated in FIGURES 1–9, FIGURES 1 and 2 show a shaft 50 extending through a thrust bearing housing 52 which has pairs of transversely extending brackets 54 and 56. Brackets 54 connect housing 52 to foundations 58 and 60 by suitable bolts 62. Brackets 56 have spaced tie rods 64 and 66 extending therethrough to also hold housing 52 in assembled position. Tie rods 64 and 66 have threaded sections 68 and 70 on which lugs 72 are turned into snug engagement with the pairs of brackets 56. Pressure oil supply line 74 and drain line 76 are shown connected to housing 52 the purpose of which is described hereinafter. It is understood that the various parts and components mounted about the shaft 50 may be split so as to facilitate assembly and disassembly thereof.

Figure 1:
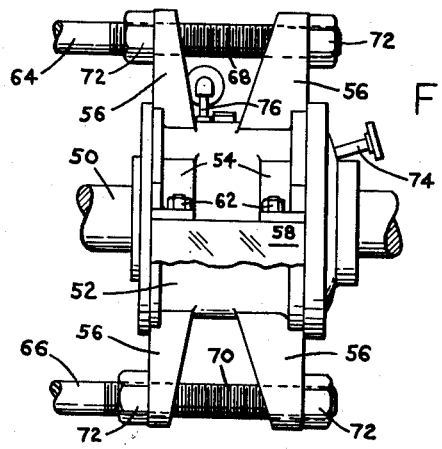
FIGURE 1 is a side elevation of a thrust bearing housing having the shaft extended therethrough and in which the present invention is embodied.
Figure 2:
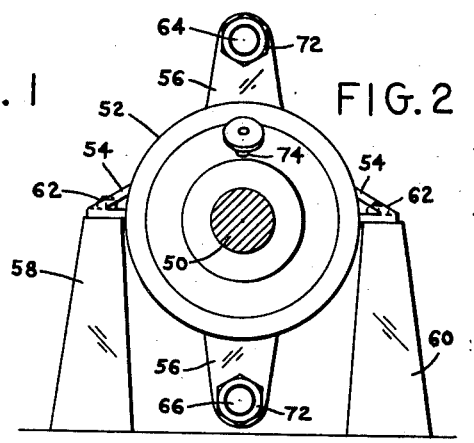
FIGURE 2 is an end view of the thrust bearing housing shown in FIGURE 1.
Figure 3:
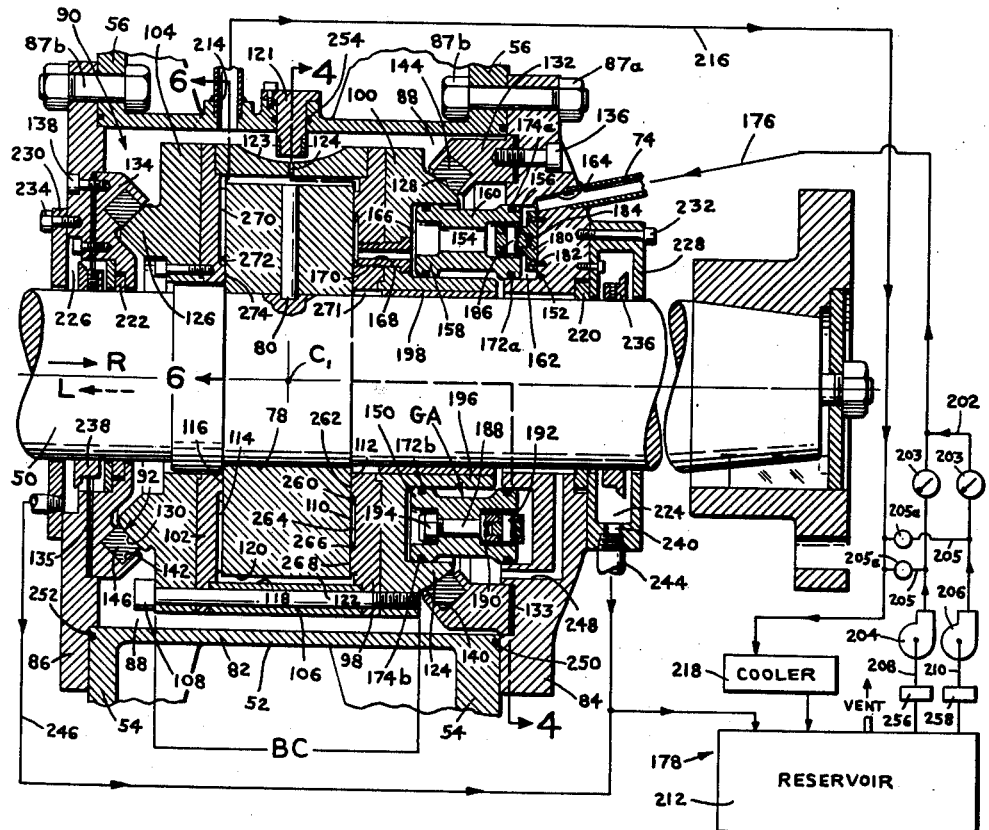
FIGURE 3 is a section taken on line 3—3 of FIGURE 4 and showing diagrammatically the associated pumping arrangement of the lubricating or bearing fluid.

FIGURE 3 shows that shaft 50 has a thrust collar 78 suitably connected thereto, for example, as by shrink fit and held in position by dowel pin 80. Disposed about thrust collar 78 is bearing assembly housing 52 which has an annular member 82 open at both ends and spaced outwardly of the collar 78. Member 82 has brackets 54 and 56 extending therefrom and front cover 84 and rear cover plate 86 connected thereto by suitable means, for example, by nuts and bolts 87a and 87b thus forming bearing chamber 88 in which the thrust bearing assembly 90 is disposed.

The thrust bearing assembly 90 includes a bearing cage assembly BC, bearing cage support assembly 92, and gimbal assembly GA.

In bearing cage assembly BC there is a pair of associated bearing plates, front bearing plate 98 mounted on a front guide member 100 and rear bearing plate 102 mounted on a rear guide member 104. The front bearing plate 98 and the rear bearing plate 102 are held in fixed predetermined spatial relationship by an annular spacer 106 when the elements are joined together by a plurality of connecting bolts 108 spaced circumferentially relative these parts and extending substantially parallel to the axis of the shaft 50 just inwardly of the outer edge of the respective bearing plates 98 and 102, guide members 100 and 104 and annular spacer 106.

The front bearing plate 98 has a face 110 which coacts with the front face 112 of the thrust collar 78 when the axial thrust along the shaft is in a direction shown by the arrow R and the rear bearing plate 102 has a face 114 which coacts with the rear face 116 of the thrust collar 78 when the axial thrust is in the direction shown by the arrow L. It will be understood that the rear bearing plate can be a conventional Kingsbury type thrust bearing, as is shown in the embodiment of the invention shown in FIGURES 14 and 25, without departing from the scope of the present invention.

The bearing cage assembly BC is mounted about the thrust collar 78 and the diameter of the inner wall 118 of the annular spacer 106 is greater than that of the outer periphery 120 of the thrust collar 78 so that an annular chamber or passage 122 is created between spacer 106 and the outer periphery 120 of the thrust collar 78. A small vent 124 is formed in the spacer 106 to allow trapped air to escape. Also, to prevent the bearing cage assembly BC from rotating an anti-rotation pin 121 is extended through member 82 and disposed in groove 123 of the annular spacer 106.

In addition, the annular spacer 106 will be sized so that the fixed predetermined spatial relation between the faces 110 and 114 of the respective front bearing plate 98 and rear bearing plate 102 will be slightly greater than the width of the thrust collar 78. For example, on a thrust collar 5 inches in width spacing of the bearing plate faces will be greater in width than the width of the thrust collar 78 by approximately $20 \times 10^{-3}$, an amount sufficiently great whereby an oil return space will exist between the collar and the bearing out of engagement therewith as more fully described hereinafter.

The bearing cage assembly BC is so mounted by the bearing cage support assembly 92 that this differential in width under the static or dynamic condition of operation will permit minute universal angular movement of the bearing cage assembly BC responsive to the thrust collar 78 runout. The runout or misalignment of thrust collar 78 occurs when its sealing face is not perpendicular to the axis of shaft 50, usually due to operating or manufacturing tolerances. The respective front and rear bearing plates 98 and 102 furthermore are so positioned relative to the front frace 112 and the rear face 116 of the thrust collar 78 so as to provide clearance space therebetween which space will vary under bearing conditions in width but the adequate value of the two clearance spaces will at all times equal the total differential distance between the width of the thrust collar and the spatial distance the bearing faces of the bearing plates 98 and 102 are spaced relative to each other.

Furthermore, by reason of this operative relation between the bearing plates 98 and 102 and thrust collar 78, a predetermined minimum fluid thickness is maintained between the coacting faces of the respective bearing plate 98 or 102 and the thrust collar 78, as more fully described hereinafter, whether under static or dynamic conditions.

Assuming the axial thrust is in a direction of the arrow R, fluid is introduced at the front face 112 of the thrust collar 78 for flow through clearance spaces, which usually will range from $1 \times 10^{-3}$ to $3 \times 10^{-3}$, formed between the front face 112 and coacting face 110 of the front bearing plate 98 and thence via the annular chamber 122 around to the rear side of thrust collar 78 to flow through the clearance spaces formed between the rear face 116 of the thrust collar 78 and the face 114 of the rear bearing plate 102. The clearance on the rear side of thrust collar 78 will be sufficiently great so as to create no appreciable restriction to the flow of fluid between the rear face 116 of thrust collar 78 and face 114 of the rear bearing plate 102. Thus, the fluid will flow in this clearance as if it were passing through a conduit.

Conversely, if the axial thrust is in the direction of the arrow L, a conduit like passage will be created by the clearance between the front face 112 of the thrust collar 78 and face 110 of the front bearing plate 98. In this instance it will be the face 114 of the rear bearing plate 102 and the rear face 116 of the thrust collar 78 which coact under the load L.

The resultant thrust loads R and L, indicated by the solid and dotted arrows, respectively, will not act at the same time but rather alternately. Further, the maximum resultant thrust load R in most instances will be many times greater in magnitude than the maximum resultant thrust load L. Accordingly, the present illustration of the invention is adapted to transmit only the force R, without creating distortion on critical members, to non-critical members which are free to distort, as more fully described hereinafter. It is understood that if the thrust load L were large enough to cause distortion that the structure could be modified within the scope of the invention to transfer the distortion causing forces to non-critical members as was done with the thrust load R.

In order that the bearing cage assembly BC may operate under loads R or L the bearing cage support assembly 92 must serve a dual function. First, it must accommodate the axial displacement of the bearing cage BC responsive to either direction of thrust R or L. Second, it must allow the bearing cage assembly BC to continuously adjust to the thrust collar 78 runout or misalignment. To accomplish this, each guide member 100 and 104 remote from the bearing plates 98 and 102 has annular projections 124 and 126 formed thereon extending in opposite directions away from the thrust collar 78 on their respective guide members.

These annular projections 124 and 126 have an outer surface 128 and 130 respectively which is formed on a common spherical radii measured from the center of oscillation $C_1$ of the bearing cage assembly BC. Responsive to the thrust collar 78 runout the bearing cage assembly BC will swivel about its center $C_1$ as a result of the operative association of either of the sperical surfaces 128 and 130 with the bearing cage support assembly 92.

Spherical surfaces 128 and 130 coact with the support assembly 92 for mounting the bearing cage assembly BC which support assembly includes a front ring holder 132 and a rear ring holder 134 securely connected by any suitable means to the respective front cover plate 84 and rear cover plate 86 of the bearing chamber 88 as by threaded member 136 for the front ring holder 132 and threaded member 138 for the rear ring holder 134.

The ring holders 132 and 134 are annular members having a plurality of spaced bores or pockets as at 140 and 142 respectively formed therein whose center lines are in substantial alignment with the center for the spherical radii of the respective spherical surfaces 128 and 130. This construction permits front thrust bushing 144 and rear thrust bushing 146 to be mounted in bores 140 and 142 so they can be selectively brought into operative engagement with the respective front and rear spherical surfaces 128 and 130. The material of bushings 144 and 146 is selected for its low frictional properties so that when the bearing cage assembly BC is angularly or axially displaced by runout of thrust collar 78 or thrust loads R or L, respectively, there is negligible frictional resistance and the angular or axial displacement is not interfered with.

Due to manufacturing tolerances it may be necessary to adjust the position of the bearing support assembly 92 as by front shims 133 and rear shims 135. In operative assembly the bearing suport assembly 92 provides slight axial displacement of the bearing cage assembly BC responsive to the resulting axial thrust load R or L changing from one to the other. If the thrust load R is assumed to be acting, then only the front bushings 144 will carry load, which load is a small residual of the thrust load R that was not transmitted to the bearing fluid. However, assuming thrust load L is acting, then only rear bushing will carry load, which load may equal the thrust load L. In any event whether bushing 144 or 146 are carrying load the amount of load which they can accommodate is substantially equal to the magnitude of the maximum resultant thrust load L.

Since the support assembly 92 provides for the bearing cage assembly BC to have both a slight axial displacement and an adequate swiveling movement necessary for proper operation of the thrust bearing, the gimbal assembly GA must not restrict such movement while providing a pressure balancing means to transmit forces from critical to non-critical members of the thrust bearing assembly 90.

Figure 8:
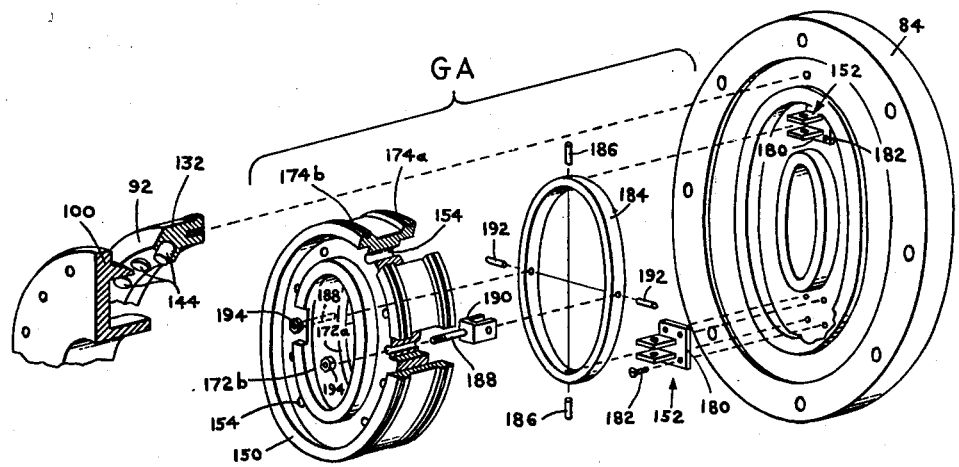
FIGURE 8 is an exploded view of the floating ring and gimbal assemblies of FIGURE 3.

The gimbal assembly GA as shown in FIGURES 3, 4 and 8 includes a floating ring member generally designated 150 and a stationary support means generally designated 152.

The floating ring member 150 is an annular element having a plurality of axially extending passages 154 in spaced relation to each other and concentric to the axis of the shaft 50. The respective ends 156 and 158 of the floating ring member 150 are slightly wider than the central portion 160 of the ring member, which ends are rounded to accommodate universal or swiveling movement thereof. The floating ring member 150 is disposed in bearing chamber 88 so that end 156 is mounted in an annular inlet chamber 162 formed in the front cover plate 84 which communicates with lubricating or bearing fluid inlet passage 164 and the other end 158 is mounted in an annular outlet chamber 166 formed in the guide means 100 which communicates with the inlet end of the passage 168 of oil tube bolt 170 communicating with the face 110 of front bearing plate 98.

O-ring seals 172a and 172b and 174a and 174b are provided about the periphery of the respective ends 156 and 158 to seal the high pressure lubricant or bearing fluid which will be introduced into inlet passage 164 by connecting line 176 of oil supply system 178 from which it passes to inlet chamber 162, passages 154, outlet chamber 166 and the passages 168 of oil tubes 170, for purposes more fully described hereinafter.

The floating ring member 150 is held in assembled position by stationary support means 152 which support means is so connected to the ring 150 that the enttire arrangement permits coaction with the axial and swivelable movement of the bearing cage assembly BC.

Thus the stationary support means 152 includes a pair of stationary clevis members 180 disposed at 180 degrees to each other and fixedly connected to the bearing chamber face of front cover 84 as by threaded means 182.

Clevis 180 is formed so as to receive an annular ring 184 which is pivotally connected thereto along a plane passing through the connecting means for example connecting pins 186.

The annular ring 184 in turn provides means for connecting a pair of elongated threaded elements or floating clevises 188 to the floatting ring member 150 along a plane at 90 degrees to the plane of the stationary clevises 180 and ring 184 pivotal connection to provide for the floating ring member 150 to have universal movement about a center located by the intersection of the areas of shaft 50 with planes at right angles thereto passing through clevises pins 186 and 192. Elongated threaded elements 188 have a yoke like means 190 at one end connected by pivot means 192 to the annular ring 184. The elongated threaded elements 188 extend from this point of connection on annular ring 184 axially through the floating ring member 150 where the nut means 194 holds the threaded elements in assembled position.

The elongated threaded elements 188 are spaced at 180 degrees to each other and thus stationary clevis 180 and floating clevis 188 provide the gimbal arrangement with the horizontal and vertical pivot points for universal movement thereof. This horizontal and vertical pivoting plane is coupled with the rounded ends 156 and 158 to permit axial sliding and swivelable movement of the gimbal assembly GA in accordance with axial swiveling action of the bearing cage assembly BC.

Outlet chamber 166 formed in the front guide plate 100 is between projection 124 and inner projection 196 which is in juxtaposition to journal bearing 198. The journal bearing 198 suitably journals shaft 50 with other conventional bearings (not shown) being used at other points along the shaft 50. Since the major concern for proper operation free of mechanical failure in any thrust bearing depends on maintaining at least a safe minimum fluid film thickness the present invention includes an oil supply system 178 for delivering bearing or lubricating fluid to the parts in the bearing chamber 88 at sufficient pressure to obtain unit loads up to at least 2000 p.s.i. on the faces of the coacting thrust bearing rotary elements and stationary elements whereby large thrust loads can be supported without destroying the safe minimum fluid film thickness that may range between $1 \times 10^{-3}$ and $3 \times 10^{-3}$ inches.

This pumping system is shown diagrammatically in FIGURE 3 as including an inlet passage 164 in front cover 84 which is connected by lines 176 and 202 to positive displacement pumps 204 and 206 which pumps in turn have their suction inlets connected by suction lines 208 and 210 to any suitable source of lubricating or bearing fluid such as the reservoir 212.

The positive displacement pumps 204 and 206 when operated simultaneously will provide equal capacities, the sum of which will meet the bearings normal requirements. However, in emergencies the delivery from only one pump is adequate to meet the bearing requirements and under these circumstances the minimum film thickness between the coacting stationary and rotating thrust bearing elements will be approximately 30% less than usual when the load is in the direction R.

Since in many applications the noise of the pump could be significant it will be desirable that noise of the positive displacement pumps be maintained at low levels by proper selection of pump design and particularly pump speeds. If necessary, the pump can be housed in sound absorption material, vibration isolated and connected by flexible hose to the associated conduits or other parts to diminish any conducted noise from the pump. Such pumps are readily available on the open market and hence are not more fully described herein.

In operation fluid from the reservoir 212 is drawn through the suction lines 208 and 210 into the pumps 204 and 106 and discharged therefrom through lines 176 and 202 to the inlet passage 164 of inlet chamber 162. This pressure fluid will be passed into the respective thrust bearing parts as is more fully described hereinafter and will collect in the bearing chamber 88 for return by differential pressure to the reservoir 212 via the outlet passage 214 in housing 52 and return line 216 connected between the outlet passage 214 and the reservoir 212. An oil cooler 218 is provided to cool the returning bearing fluid before it is recirculated in the inlet chamber 162 as above described.

While the thrust bearing assembly 90 is provided with ring seals 220 and 222 at the respective front and rear ends of the bearing chamber 88, some leakage of lubrication fluid does occur. In order to meet this problem collection chambers at 224 and 226 are formed outboard of the thrust bearing assembly 90 by a front end cap 228 and a rear end cap 230 connected by threaded members 232 and 234 to the respective front cover 84 and rear cover 86. Front slinger ring 236 and rear slinger ring 238 mounted on and rotatable with the shaft 50 are disposed in the collection chambers 224 and 226 respectively to pump leakage fluid which collects in the collection chambers 224 and 226 through the outlets 240 and 242 and lines 244 and 246 connected thereto to deliver the fluid to the reservoir 212 for recirculation.

An equally effective form of returning the leakage fluid to the reservoir is illustrated as return passage 248 in which the fluid leaking across the shaft past the journal bearing 198 will enter and pass therethrough to be deposited adjacent the front ring holder 132 through which it flows into the bottom of chamber 88. From chamber 88 it will be returned to the reservoir 212 as described hereinafter.

To prevent pressure fluid leaking from chamber 80 O-rings 250, 252 and 254 are disposed in the member 82 between its respective connections with the front cover plate 84, rear cover plate 86 and anti-rotation pin 121.

Lines 176 and 202 have checks valves 203 therein to prevent pressure fluid backup in the event one of the pumps 204 or 206 is not in operation. Connected below valves 203 are relief valve lines 205 including relief valves 205a, which interconnect lines 176 and 202 with line 216 and serve as a further safety feature.

It is also desirable to provide strainers as at 256 and 258 in the suction lines 208 and 210 for the pumps 204 and 206. These strainers serve to remove any particles of foreign matter that might affect the operation of the thrust or journal bearings if such particles became wedged between those bearing parts where the clearance spaces therebetween are critical.

In order to understand how fluid which is pumped under high pressure to the bearing parts coacts with the thrust collar 78 it is necessary to understand the problems which must be overcome.

First, it will be understood by those skilled in the art that where relatively high unit pressure, i.e., pressures in excess of 1000 p.s.i., are used to counteract the high static and dynamic axial forces along the shaft, distortion of the loaded thrust bearing member whose face is coacting directly with the adjacent face of the thrust collar becomes a major problem affecting the operation of the thrust bearing because this distortion may be a large percent of the minimum fluid film thickness.

Second, appreciable angular misalignment of the face of the thrust collar 78 with respect to the bearing housing due to deflection of the shaft relative to the thrust bearing support and other reasons must be accommodated without material change in the safe minimum fluid film thickness between the face of the rotating thrust collar 78 and the associated faces of the bearing parts coacting therewith.

In the present invention this distortion is overcome by balancing thrust load forces on either side of that bearing part critical to such distortion and transmitting this thrust load force to an element of the thrust bearing assembly which is not sensitive to distortion.

Accommodation of misalignment caused by deflection and other reasons is accomplished by providing structure such that hydrostatic and hydrodynamic restoring moments are continuously functioning through the full 360 degree circumferential area of the faces of the stationary bearing parts coacting with the front face 112 and rear face 116 of thrust collar 78 whereby the predetermined minimum safe fluid film thickness is maintained continuously under both static and dynamic operating conditions as long as the pumping system above described is in operation.

With these two principles in mind, we again refer to the bearing parts disposed in the bearing chamber 88 as shown in FIGURES 3–7.

The face structure of front bearing plate 98 is determined in part by the point where the high pressure lubricant for bearing fluid is introduced because the fluid will under both static and dynamic conditions flow in the direction of lower pressure; hence, the design must be one which will get a proper dispersion of the fluid so as to provide and maintain a desired minimum safe fluid film thickness between the rotating and nonrotating parts of the bearing.

Assuming that the force is in the direction of the arrow R, the FIGURES 3 and 4 show that the high pressure lubricating fluid is delivered to the space between the face 110 of front bearing plate 98 and the front face 112 of thrust collar 78 by a plurality of passages 168 which extend through the front bearing plate 98 and its associated guide means 100 in a pattern concentric to and a spaced distance radially of the axial line of shaft 50 and in spaced relation to each other.

The inlet end of passage 168 will receive high pressure lubricating or bearing fluid from the reservoir 212 as was hereinbefore described. The lubricating fluid passes through passages 168 to the outlet end thereof which communicates with an inner annular groove 260 disposed on the face 110 of the front bearing plate 98 a spaced radial distance from the inner periphery thereof so that an inner annular dam means 262 is formed between the inner periphery and the inner annular groove 260. Inner annular groove 260 in turn communicates by means of a plurality of radial grooves 264 with an outer annular groove 266 in face 110 of front bearing plate 98 a spaced distance inwardly of the outer periphery of the bearing plate 98 whereby an outer annular dam means 268 is formed between the outer periphery and the outer annular groove 266. Lubricating or bearing fluid introduced through the passages 168 can thus flow uniformly through the inner annular groove 260, the radial grooves 264 and the outer annular grooves 266.

One portion of this delivered fluid flows across the inner annular dam means 262, along the shaft 50 through the annular space 271 between the inner periphery of the front bearing plate 98 and the outer surface of the shaft 50 to the journal bearing 198. A certain amount of leakage fluid passes from the journal bearing 198 with most of this passing through passage 248 to chamber 88 and a much smaller amount passing through the seal 220 to the collection chamber 224 as above described.

Similarly, from the outer annular groove 266 another portion of the lubricating or bearing fluid will flow through the clearance space across the face of the outer annular dam means 268 to the annular space 122 and out of the bearing cage assembly BC through the clearance between rear bearing plate 102 and the rear face 116 of the thrust collar 78 and thence into chamber 88 where it combines with that portion from passage 248 and then back to the reservoir 212 via passage 214 in the bearing chamber 88 and return line 216. It is noted that a plurality of bushings 144 and 146 are mounted in spaced relationship on their respective ring holders 132 and 134 so that the bearing fluid in chamber 88 is free to flow therebetween.

Only a small portion of the fluid will leak past seal ring 222 and into collection chamber 226 for return to reservoir 212 via passage 242 and line 246.

Since the high pressure fluid will be acting in the clearance space, an axial force will be exerted on the respective front face 112 of the thrust collar 78 and the face 110 of front bearing plate 98, which force is a concomitant of the axial force being exerted along the shaft 50 such force being in the direction of the arrow R.

Conversely, as shown in FIGURES 3 and 6 if the axial force is assumed to be in the direction of the arrow L then a clearance space will exist between the face 110 of front bearing plate 98 and the front face 112 of the thrust collar 78 and the fluid will pass therethrough and across passage 122 to the now coacting rear face 116 of thrust collar 78 and face 114 of rear bearing plate 102.

The fluid is introduced between the coacting faces from a plurality of radial grooves 270 which grooves communicate at one end with the annular space 122 and at the other end with an annular groove 272 inwardly of the inner periphery of bearing plate 102 so that once again an inner annular dam means 274 is formed and will function in the same manner as the dam means 262 and 268 on the bearing plate 98. Further, inner annular dam means 274 will sufficiently restrict the flow of bearing fluid so that a backup occurs which ensures a supply to journal bearing 198. The diameters of grooved circular passage 272 is preferably smaller than annular groove 260 and concentric about centerline of shaft 50. The geometry of pads 286 is similar to that descibed hereinafter under pads 276 with surfaces 286a on either side of pads 286 forming the step construction.

Once again a portion of the fluid will flow past dam 262 and along shaft 50 past journal bearing 198 and into passage 248 from which it enters chamber 88. Another portion flowing past dam 274 will enter bearing chamber 88 and join the portion from passage 248 therein and is returned to reservoir 212 as above described. The last portions will be small and constitute that part of the bearing fluid that leaks past ring seals 220 and 222 into collection chambers 224 and 226 respectively from which the fluid will be returned to reservoir 212 as above described.

The bearing cage assembly BC is adapted for swiveling or universal movement by reason of its supporting assembly 92. This is necessary to permit the faces 110 and 114 of the respective bearing plates 98 and 102 to maintain constant parallelism with the respective front face 112 and rear face 116 of thrust collar 78 depending on the direction of axial force along the shaft 50.

This is accomplished by providing a means for applying restoring moments against the face of the respective bearing plates 98 and 102 whichever is operative.

Thus FIGURES 4 and 5 show that between the radial groove 264 on face 110 of front bearing plate 98 a plurality of pads generally designated 276 are formed on the face 110 of the bearing plate 98.

Each of these pads 276 are identical in construction, hence, only one of the pads is shown in enlarged cross-section at FIGURE 5 of the drawings. Thus, pads 276 are shown as having a pair of milled surfaces as at 278 and 280 disposed in spaced relation to form a step as at 88 on both sides of the center section 284 of each pad 276.

Because of the symmetrical construction of pads 276 they can operate equally effective whether rotation of shaft 50 is clockwise or counter clockwise. Fluid is introduced by passage 168 and is distributed about each pad 276 by radial grooves 264 and annular grooves 260 and 266. Depending on the direction of rotation, the fluid will cross either surface 278 or 280 and be "dragged" across pad 276 as a fluid film.

Assuming the axial force is in the direction of the arrow R then at static conditions the forces acting through the fluid between the front side 112 of thrust collar 78 and face 110 of front bearing plate 98 will act on pads 276 and cause the front bearing plate 98 to swivel until the face 110 is parallel or square to the front face 112 of thrust collar 78 or in other words the forces and moments acting on the respective faces will be balanced. Once this parallelism is obtained or simultaneously with the obtaining of this parallelism, on the thrust collar 78 moving towards or away from stationary bearing plate 98 and similarly on the stationary bearing plate moving towards or away from the thrust collar 78 the forces and moments will again act to restore a balance across the clearance space therebetween.

Under dynamic conditions these forces and moments acting between the front face 112 of thrust collar 78 and face 110 of bearing plate 98 will be continuously in action because the "runout" or "misalignment" characteristics of the thrust collar 78 will cause a continuous application of righting moments at each particular portion of the coacting faces. If the forces caused by dynamic pressure acting on pads 276 are unequal along a plane passing through the axis of shaft 50 a righting moment is generated which causes the bearing cage assembly BC to swivel about its center of oscillation $C_1$. Such swiveling movement brings the coacting faces 110 and 112 into parallel relationship with each other, thus equalizing the momentarily unequal forces on pads 276.

Figures 10, 11:
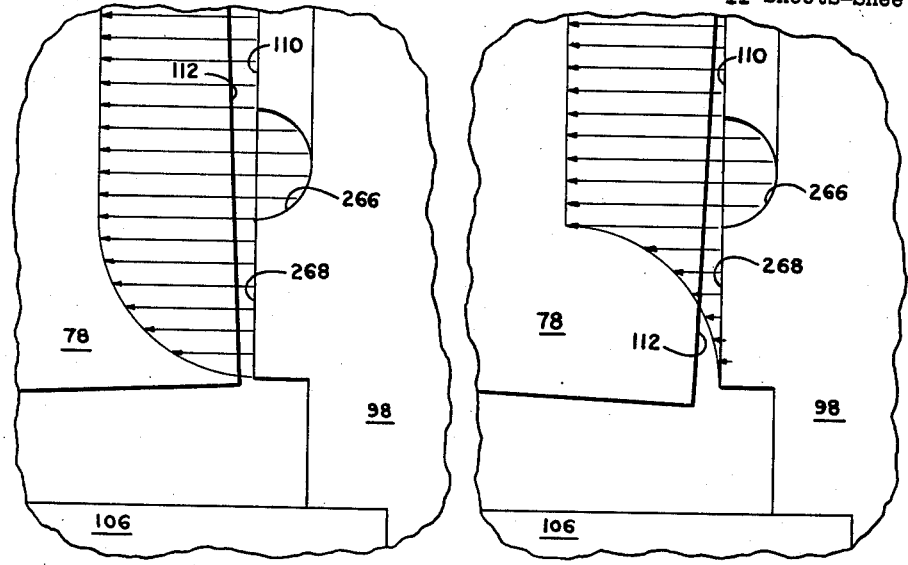
FIGURE 10 is a diagrammatic sketch showing the pressure distribution across dam 268 under converging flow conditions.
FIGURE 11 is a diagrammatic sketch showing the pressure distribution across dam 268 under diverging flow conditions.
Figures 12, 13:
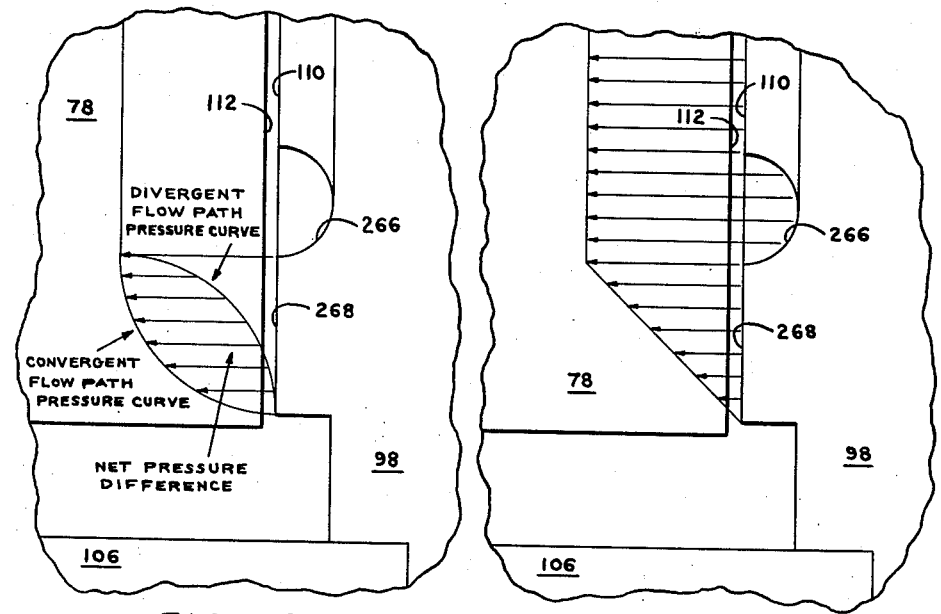
FIGURE 12 is a diagrammatic sketch showing the net force developed across dam 268 which force provides the restoring moment to re-establish parallelism.
FIGURE 13 is a diagrammatic sketch showing the lineal pressure distribution across dam 268 under parallel operations.

In addition to the dynamic pressure C, the static pressure acting across dam 268 also develops substantial restoring movement to assure parallelism between the coacting faces 110 and 112. As those skilled in the art recognize, FIGURE 10 show the distribution of pressure on dam 262 or 268 for a converging flow path whereas FIGURE 11 represents the pressure distribution at the dams for a diverging flow path. It is obvious that if plate 98 is not parallel to collar 78 at faces 110 and 112, a divergent passage would be created at dam 268, for example, on the lower half, whereas in the top half 180 degrees away a convergent passage would simultaneously occur. The summation of forces generated by pressure distribution across the two diametrically opposite areas of the dam would develop a net force as shown in FIGURE 12 which by reason of its radial position from the centerline of shaft 50 would provide a restoring movement to reestablish parallelism between the two coacting faces 110 and 112. However, it is also obvious that inner dam 262 is convergent when outer dam 268 is divergent as viewed at a section of the bearing radially outward from the shaft centerline. Consequently the restoring moment from outer dam 268 is opposed to some extent by a net moment from inner dam 262. However, the radial leverage from outer dam 268 is usually two or more times the radial leverage from inner dam 262, the net result of which is an appreciable restoring moment to maintain parallelism between the coacting faces. Since this moment is developed from static pressures, it is clear that this parallelism will be maintained even at zero speed. At 90 degrees from the plate where momentary non-parallelism between the coacting surfaces might occur the flow paths across dams 268 and 262 are parallel and under these circumstances the pressure drop across the dam is essentially linear as shown in FIGURE 13.

This linear distribution of pressure drop across the dams occurs wherever and whenever the coacting faces 110 and 112 are parallel. Consequently, if coacting faces 110 and 112 are parallel in a plane through the shaft centerline, no restoring moment from static pressure breakdown is developed nor is such a moment then needed. From this data it becomes clear that a restoring moment from hydrostatic pressures is developed only in the plane through the centerline of shaft 50 when momentary non-parallelism occurs.

Rear bearing plate 102 as shown in FIGURES 6 and 7 has pads 286 formed between radial grooves 270, however, because the maximum axial forces acting in the direction of arrow L are for this construction lesser than the axial force in the direction of arrow R, the pads are constructed more simply than those shown for the step type pads 276 of bearing plate 98. It will be understood however that for high axial forces the step type pad has the best performance characteristics to provide the desired restoring moments of force type operation called for by the present invention and that their use on the front and back sides of thrust collar 78 is within the scope of this invention.

Pads 286 operate similarly to pads 276 and likewise support rotation of shaft 50 in either direction. Accordingly, faces 112 of bearing plate 102 will be aligned parallel to rear face 116 of thrust collar 78 under the action of the restoring moments.

Assuming that the axial force is in the direction of arrow R, the combination of force R and moments generated by "runout" of thrust collar 78 would be acting in the clearance space between front face 112 of thrust collar 78 and face 110 of front bearing plate 98 and if these forces and moments become large enough, the bearing plate 98 would ordinarily distort significantly an amount equal to a large percentage of the fluid film thickness unless means is provided to prevent this from occurring. In the present invention significant distortion is prevented in this critical area by balancing the forces acting on either side of bearing plate 98 and transmitting the forces to a non-critical member.

Figure 9:
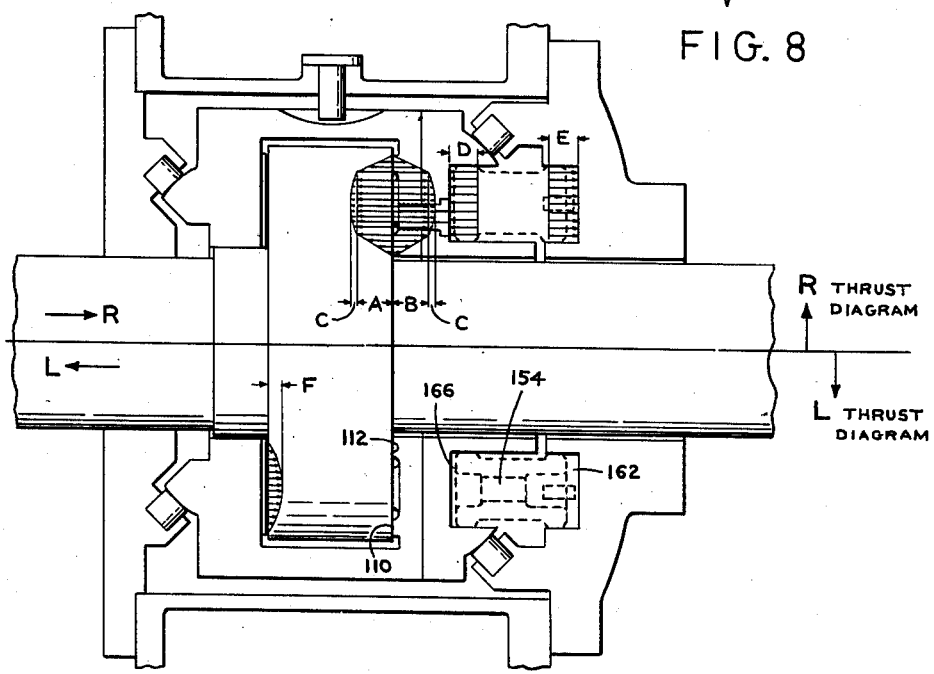
FIGURE 9 is a two-part diagrammatic sketch showing a force diagram of typical pressures acting across the bearing plate for the improved bearing assembly shown in FIGURE 3 in which the upper part shows diagrammatic pressures over areas to counteract force R and the slower part shows diagrammatic pressures over areas to counteract force L.

Under static conditions this can be accomplished by the balancing action of the pressure fluid as illustrated by the force diagram of the upper part of FIGURE 9. The force of the fluid (which is the product of pressure and effective area) acting on front face 112 of thrust collar 78 plus some small residual force caused by manufacturing tolerances acting on bushing 144 is sufficient to counteract the force acting in the direction of arrow R. Since the pressure fluid forces act uniformly, an equal and opposite force will result at B for the same reasons on the face 110 of front bearing plate 98.

The force (pressure times effective area) on face 110 subject to this high pressure will be balanced by the same hydraulic forces acting in the direction opposite thereto at D in the outlet chamber 166 on the side of the guide means remote from face 110 of bearing plate 98. Stated another way, the resultant pressure acting on area of face 110 being from approximately the midline of the inner annular dam 262 and the midpoint of the outer annular dam 268 will provide a force which will be equal and opposite to the force acting in the outlet chamber 166 which encompasses a substantially identical area. Thus, the forces acting in opposite directions of each other will balance and cancel each other because equal pressures are maintained and transmitted uniformly through the hydraulic fluid which conducts the pressure to these parts.

Since, however, the pressures are conducted by the hydraulic fluid and act uniformly therein, the pressures will be transmitted from the outlet chamber 166 through the passages 154 to the inlet chamber 162 as at E disposed in the front cover 84.

In the inlet chamber 162 the pressures in the hydraulic fluid and therefore the forces resultant therefrom can expend themselves against the front cover 84 and distort the cover without affecting the operation of the thrust bearing because this element of the thrust bearing is not critical to distortion in any way.

Thus, a thrust bearing is provided in which extremely high unit pressures can be utilized because the forces resulting therefrom will be balanced across that portion of the bearing which is critical to distortion and furthermore that portion of the bearing can by the action of the restoring forces and moments as above described be maintained square to the thrust collar face with which it coacts and thus the minimum safe predetermined clearance space required between these parts will be continuously and continually maintained.

If shaft 50 were rotated in either direction, dynamic pressures shown at C would be created acting across the coacting faces of bearing plate 98 and thrust collar 78. However, these forces are equal and opposite and therefore in balance. Furthermore, the magnitude of the dynamic pressure is much smaller than the static pressure and though not balanced in the manner described hereinbefore for static pressure forces A, B, D and E is sufficiently small so as not to create any significant distortion problems.

Assuming the force is in the direction of arrow L, which force is sufficiently small so as to create no distortion problems on the rear bearing plate 102 under either static or rotating conditions, the combined resulting dynamic pressures are shown diagrammatically in the lower part of FIGURE 9 as at F. Note that the magnitude of dynamic pressures C and F are represented in FIGURE 9 to a much larger scale than for static pressures A, B, D and E which as described hereinbefore are equal.

In the embodiment of the invention illustrated in FIGURES 14 through 20 the shaft 300 is shown in a horizontal position, but it is understood that especially for large thrust loads of 500,000 pounds or more that this embodiment may be positioned with shaft 300 vertical or at any angle therebetween.

FIGURE 14 shows a shaft 300 terminating in a thrust bearing housing 302. Foundation support 304 of housing 302 serves to mount the housing to a foundation 306 in a suitable manner, for example, by means of having bolts 308 passing through holes 310 in foundation support 304 and being received by nut 312. Housing 302 has an annular member 314 disposed between foundation support 304 and rear cover 316 thereof and suitably connected therebetween as by threaded members 318. O-rings 320 are disposed between the annular member 314 and the rear cover 316 and foundation support 304 respectively to prevent bearing fluid from leaking through the said connection. Rear cover 316 has an opening 322 therein through which shaft 300 extends into housing 302. At the opening 322 a flange 324 is formed which extends axially in both directions from rear cover 316, the end extending toward foundation support 304 the longer of the two. In the outward end of flange 324 a seal 326 is disposed while the inward end of flange 324 serves to house journal bearing 328. A Kingsbury type bearing 330 is suitably disposed in operative assembly in the inner side of rear cover 316 for purposes more fully described hereinafter. Also, chamber 332 is formed within housing 302 and pressure bearing fluid will be introduced thereto as described hereinafter.

Shaft 300 has a section 300a formed at the end thereof which is of smaller diameter and on which a thrust collar 334 is mounted as by nut 336 threadedly engages the end of section 300a. To prevent thrust collar 334 from moving independently of shaft 300 a pin 338 is disposed in groove 340 of shaft 300 whereby the shaft 300 and thrust collar 334 are fixedly connected to each other so that rotation of shaft 300 will cause collar 334 to likewise rotate. Thrust collar 334 has a front plate 342 which engages the rear plate 344. Rear plate 344 has inner annular projection 346 and outer annular projection 348 which extend into inner and outer recesses 350 and 352 respectively in the front plate 342. O-rings 354 are disposed in the joint between outer projection 348 and outer recess 352 to prevent leakage therebetween. The inner annular projection 346 touches the walls of recess 350 while in the outer annular projection 348 there is a clearance space 356 created so that projection 348 is out of engagement with the innermost wall of recess 352 so as to provide for limited axial movement at outer end of the thinner front plate 342 with respect to rear plate 344. Further, there is a clearance space 358 formed between the adjacent faces of rear plate 344 and front plate 342.

Figure 17:
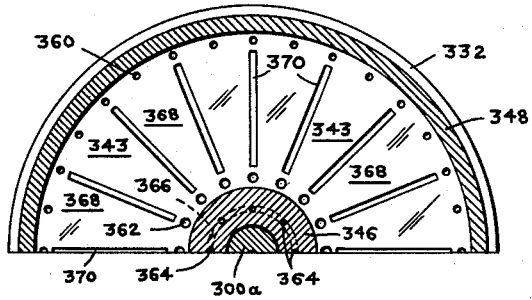
FIGURE 17 is a cross-section taken on line 17—17 of FIGURE 14.

FIGURES 14 and 17 show front plate 342 has formed therein passages 360, 362 and 364 all of which communicate the front face 341 thereof with the rear face 343. Passage 360 is formed adjacent to and radially inward from projection 348. Adjacent inner projection 346 is passage 362 while passage 364 is formed in superposition to projection 346. At the rear face 343 of front plate 342 passages 364 communicate with each other by groove 366 with the end of passage 364 at the front face 341 being partly disposed radially outward of the nut 336 so that fluid may flow freely past nut 336. Pads 368 are formed between passages 360 and 362 by radial grooves 370. The space 358 allows passages 360 and 362 to communicate freely with each other so that bearing fluid introduced through passages 360 and 362 will fill space 358. O-ring 354 prevents radially outward leakage from space 358, however, the bearing fluid may seep between projection 346 and rear face 343 to reach groove 366. Of course the clearances are so small that such minute seepage initially at the high pressure will break down into low pressure fluid by the time it enters groove 366 and passages 364.

The bearing assembly BA illustrated in FIGURE 14 is suitably disposed in housing 302 so that it is non-rotatable and suitable means (not shown) is used for this purpose. Bearing assembly BA has a front plate 372 fixedly connected to a rear plate 374 as by means of threaded members 376 and 378. Also oil tube bolts 380 are disposed therebetween to allow bearing fluid to pass from one side to the other. Front plate 372 has an opening 382 about the nut 336. Adjacent opening 382 is a cup-shaped opening 384 in rear plate 374. In the center of opening 384 is a hole 386 into which is disposed a tube 388 so as to extend the passage therethrough.

Bearing assembly BA is mounted on a cup-shaped support member 390 by the central projection 392 of rear plate 374 which has bearing face 499 formed as a spherical surface corresponding to the surface 498 of cup-shaped support member 390. The center of spherical surfaces 498 and 499 is at the intersection of the planes passing through pins 456 and 464 of the ring 422, this point designated generally as $C_0$ will coincide with the axis of shaft 300. Support member 390 has a flange 394 formed thereon which extends radially outward and is suitably connected to front cover 304 as by threaded means 396. An inwardly directed annular flange 398 is formed on support member 390 and has its rounded edges engage tube 388 so that no binding will occur on the bearing assembly BA suitably moving both linearly and angularly responsive to thrust collar 334 as described hereinafter.

FIGURES 14 and 15 show face 400 of front plate 372 on which grooves 402 are formed which communicate with the openings in oil tube bolt 380. Grooves 402 extend radially from inner annular groove 404 to outer annular groove 406 and between which is formed pads 408. The pads 408 as shown in FIGURE 16 have a step construction so that bearing fluid entering bearing assembly BA will pass through tube bolt 380 to grooves 402, 404 and 406 and distributed onto the lower step 410 from which it will, under dynamic conditions, be "dragged" across upper step 412, thus forming a fluid film in the same manner as described hereinbefore. It is by means of this fluid film that the coacting faces 341 and 400 of the thrust collar 334 and bearing assembly BA, respectively, transmit thrust load from the shaft 300 to the foundation 306 without breaking down in the process.

FIGURE 16 shows the direction of rotation of shaft 300 in the direction of the arrow. However, if the shaft 300 is desired to be rotated in either direction the pads 408 can be readily replaced with the type shown in FIGURE 5.

Adjacent inner annular groove 404, inner annular dam 414 is formed and adjacent outer annular groove 406, an outer annular dam 416 is also formed. Bearing fluid crossing dams 414 and 416 is broken down from high pressure fluid to low pressure fluid as described hereinbefore.

Bearing assembly BA, responsive to a change in the axial thrust load of shaft 300 or in response to runout of thrust collar 334, may be slightly axially displaced and/or have continuous swiveling movement across the full 360° of its circumferential area. Thus the gimbal assembly GA' must serve the dual function of allowing such movement while acting as a conduit for the pressure balancing bearing fluid to be delivered by the oil or bearing fluid supply system as described hereinafter.

Figure 18:
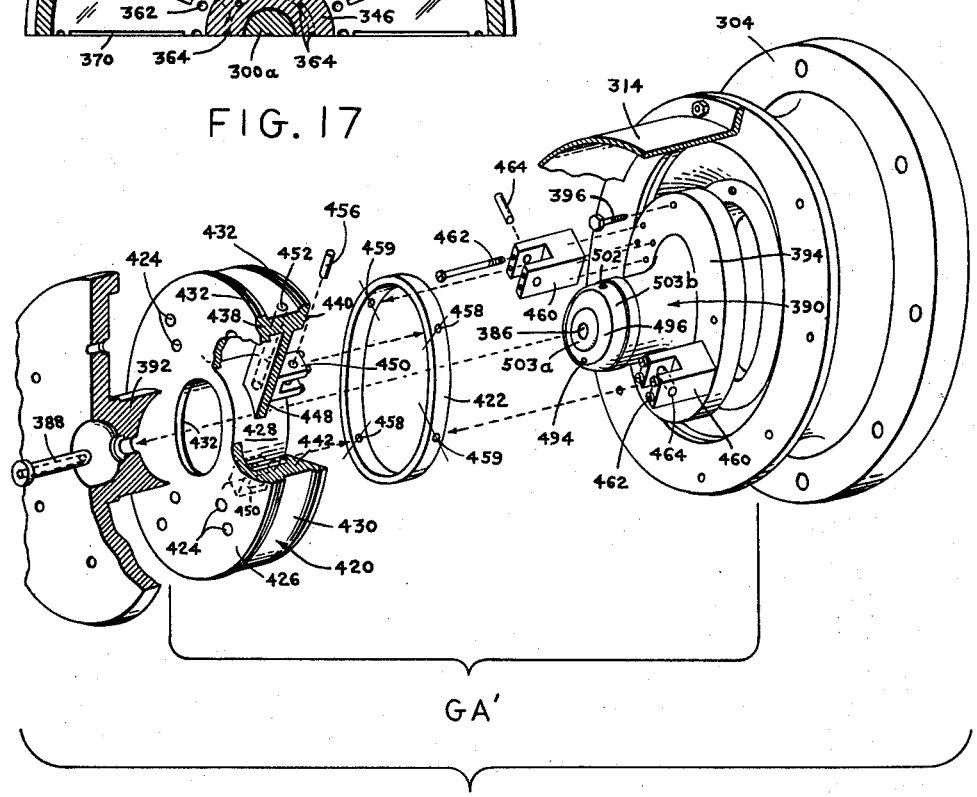
FIGURE 18 is an exploded view of the floating ring and gimbal assemblies shown in FIGURE 14.

The gimbal assembly GA' as shown in FIGURES 14 and 18 includes a floating ring 420 operatively associated with a gimbal ring 422.

The floating ring 420 is an annular element having a plurality of axially extending openings 424 on its rear face 426, which openings are disposed between inner ring 428 and outer ring 430 and communicate with passage 446 therebetween. O-rings 432 are disposed on slightly raised and rounded ends 438 and 440 of both the inner ring 428 and the outer ring 430 and coact within the recesses 434 and 436 in rear plate 374 and foundation support 304, respectively, to seal an accommodate universal or swiveling movement of the bearing assembly BA. The center portion 442 of floating ring 420 is of a different diameter than the ends 438 and 440 thereof. It is noted that the floating ring 420 is free to move axially within the respective recesses 434 and 436. The end 440 of floating ring 420 has an opening 444 which communicates with passage 446 to allow free flow of bearing fluid from end 440 to end 438. Webs 448 extend between inner ring 428 and outer ring 430 on either side of the axis of shaft 300 and have floating clevis 450 suitably connected thereto as by threaded members 451, which clevis extends in the direction of foundation support 304 beyond the end 440. Hole 452 extends the length of web 448 thereby enabling chamber 332 to communicate with the space 454 formed between the inner ring 428 of floating ring 420 and the respective outer peripheries of projection 392 and the cup-shaped support member 390.

Gimbal ring 422 is pivotally connected to the floating clevis 450 by pins 456 which extend into openings 458, the connection being along a plane extending through the openings of clevis 450 on either side of the axis of shaft 300. Stationary clevises 460 are suitably connected to opposite sides of flange 394 as by threaded members 462 along a plane at 90° to the plane of the floating clevis 450. Gimbal ring 422 is pivotally connected along the plane of stationary clevises 460 by pins 464 passing through openings 459. Thus gimbal ring 422 has universal movement as it is pivotal along two planes at 90° to each other. It is noted all the members of bearing assembly BA and also the members of the gimbal assembly GA' pivot about the same point, namely, the point of intersection of the transverse planes (with respect to the axis of shaft 300) passing through pins 456 and 464, respectively.

Floating ring 420 effectively divides chamber 332 into a high pressure portion 466 and a low pressure portion 468. In this illustration of the invention the high pressure fluid may be up to at least 5000 p.s.i. which is supplied by the oil or fluid supply system 470.

Oil or bearing fluid supply system 470 operates in substantially the same manner as system 178 shown in FIGURE 3. However, for the purpose of clarity the components will be briefly referred to. The oil or bearing fluid is stored in reservoir 472 and is withdrawn therefrom through inlet lines 474 and 476, respectively. Each inlet line has a positive displacement pump 478 therein and on the inlet side of pumps 478 there is a filter 480 and on the outlet side there are check valves 482. Pumps 478 may operate simultaneously or individually as was described hereinbefore. Inlet lines 474 and 476 connect into inlet lines 484 and 486 so that the flow is divided in two directions with the larger quantity entering inlet line 484 where it is introduced into the high pressure portion 466 of chamber 332 through passage 488 in front cover 304. The flow in line 486 is directed through filter 490 and orifice 492 wherein some pressure drop occurs before entering passage 494 of cup-shaped support member 390. Passage 494 communicates with groove 496 on the support surface 498 of cup-shaped support member 390. The high pressure fluid from groove 496 will form a non-friction fluid film between surfaces 498 and bearing face 499 of projection 392 which facilitates the swiveling movement of the bearing assembly BA. The pressure will break down across inner and outer dams 503a and 503b, respectively, in a manner well known in the art. The flow across inner dam 503a will be directed to the space 500 within the cup-shaped support member 390 from which it passes through passage 502 into space 454 and meets with the fluid of the outer flow 503b which occurs directly to space 454. From space 454 it will pass into the low pressure portion 468 of chamber 332 by way of hole 452. Further, fluid in chamber 505 will enter space 500 via tube 388 and combine with the other fluid by passing between the loosely fitting flange 393 and tube 388. Sealed cap 507 is suitably connected to member 390 to maintain space 503 leakproof.

The main portion high pressure fluid in high pressure portion 466 of chamber 332 will enter opening 444 of floating ring 420 and pass through passage 446 and openings 424 and proceed into the space 504 between recess 434 and end 438 of floating ring 420. Next the fluid passes through oil tube bolt 380 where it is communicated to groove 402 of face 400. A portion of the fluid from groove 402 will reach space 358 by means of passages 360 and 362 from which minute amounts may seep to groove 366 and enter chamber 500 from passage 364. Thus high pressure fluid will be acting on both faces 341 and 343 of the front plate 342 of thrust collar 334.

Since inner and outer diameters of face 343 are opposite the mid-points of dams 414 and 416 of bearing face 431 the total force (unit pressure times area) acting on faces 341 and 343 is approximately equal. With these large forces in balance, front plate 342 will not distort even when high unit pressures of 5000 p.s.i. or more are supplied from pumps 478. Such high unit pressures may cause appreciable deflection of rear plate 344 but such deflection is not transferred to front plate 342 due to the relative movement possible at O-ring seal 354. However, this deflection of rear plate 344 is not critical to the bearing performance for reasons more fully described hereinafter. Assuming the axial thrust load on shaft 300 is acting in the direction of arrow R the coacting faces 341 and 400, respectively, of front plate 342 of thrust collar 334 and the front plate 372 of bearing assembly BA will form a fluid film therebetween the manner substantially as described hereinbefore. Hence, fluid will be distributed throughout pads 408 and will cross inner dam 414 and outer dam 416 and will be broken down into low pressure fluid. The fluid crossing dam 416 will enter low pressure portion 468 directly while the fluid crossing dam 414 will enter space 505 and pass to portion 468 via chamber 500 and space 454.

Whether or not the axial thrust load acting along shaft 300 is in the direction of arrows R or L the operation and distribution of bearing fluid is substantially the same. Thus, once it has reached the low-pressure portion 468 of chamber 332 it will pass between the coacting faces of bearing 330 and rear plate 344 and enter space 506 from which it passes between journal bearing 328 and shaft 300 into the outlet passage 508 and returns to reservoir 472 via return line 510. Prior to entering reservoir 472 the fluid in line 510 will pass through cooler 512. As an added safety feature bypass lines 514 having relief valves 516 therein are connected between inlet lines 474, 476 and return line 510, respectively. A further bypass line 518 having a relief valve 520 therein is connected between line 486 and reservoir 472.

In this illustration of the invention the force R will normally be many times greater than the force L.

In the present illustration of the invention the distortion is overcome in a manner substantially similar to that described hereinbefore, namely, by balancing the thrust forces on the bearing parts critical to distortion and transmitting this thrust force to an element of the thrust bearing assembly which is not sensitive to distortion. Further, there is the additional feature of having the high pressure fluid acting on both sides of the front plate 342 of thrust collar 334 to effectively balance this component also whereby the distortional forces are transmitted to the rear plate 344 which like the foundation support 304 is not sensitive to distortion. The relatively small diameter and thick sections of cup-shaped member 390 make it too stiff to permit appreciable deflection.

A complete force diagram is shown in FIGURE 19 in which the upper part shows the pressures responsive to the high pressure fluid and the axial thrust load R, and the lower part shows the pressure responsive to axial thrust load L. Thus it is seen that the pressures of the high pressure fluid are equal at:

(1) Coacting faces 341 and 400, respectively, of the front plate 372 of bearing assembly BA and the front plate 342 of thrust collar 334;
(2) Faces 341 and 343 of front plate 342;
(3) Face 400 of front plate 372 and the front face 375 of rear plate 374.

These balanced pressures are designated respectively as follows: G and H; M and N; G and J; H and K; all of which pressures are equal.

If shaft 300 is rotated it will cause dynamic pressure to develop. However, these forces are relatively small in comparison with the static pressures of the high pressure fluid and will be about 5% of the maximum value of thrust load R. The dynamic pressures are equal and opposite as represented at O and P, but are of such magnitude as not to cause significant distortion. In order to facilitate their representation these dynamic pressures are shown in FIGURES 19 and 20 much larger than would be their actual relative size when compared to the static pressures. Thus the fact that these small pressures are not counterbalanced across plates 342 and 372 is inconsequential as far as deformational and distortional effects are concerned.

Accordingly, the pressure H will cause an equal and opposite pressure to act as at K thus balancing the forces across the bearing assembly BA.

Force is the product of unit pressure and area. The force generated by pressure H is equal to the area between circular grooves 406 and 404 plus one-half the sum of areas of dams 414 and 416 times pressure H. Hence, the resultant force at H may be expressed as follows:

$$F_H = H\,(A_B + \tfrac{1}{2} A_{do} + \tfrac{1}{2} A_{di})$$

where:

$F_H$=Force from pressure H
$H$=Unit pressure H
$A_B$=Area between circular grooves 406 and 404
$A_{do}$=Area of outer dam 416
$A_{di}$=Area of inner dam 414

By choosing the inner and outer diameters of ring 420, in particular, the diameters at 434 and 438 which are equal to the diameters at 436 and 440, respectively, forces generated by pressures K and L can be made equal to $F_H$. The area over which pressures K or L are effective is designated generally as $A_K$, and the forces on these areas designated generally as $A_K$, and the forces on these areas are designated generally as $F_K$ or $F_L$. Actually in recognition of manufacturing tolerances, forces $F_K$ and $F_L$ are made slightly less than forces $F_H$ or $F_G$. For practical purposes this may be neglected. Therefore it is apparent that:

$$F_H = F_K = F_L$$

Since the forces in plate 372 are in balance, no deformation of this plate occurs and the net resultant unbalanced force $F_L$ is imposed on members insensitive to distortion.

The pressures M and N are equal and these pressures are less than the pressures I, J, G, H, K or L because fluid reaching cup-shaped surfaces 498 and 499 experience some pressure loss at orifice 492 as stated hereinbefore. Further, as those skilled in the art will recognize, the pressures M and N are variable depending upon the film thickness across the dams 503a and 503b, as larger clearances will cause a larger pressure reduction. Also, let the force at these cup-shaped areas be designated by $F_M$ or $F_N$, the forces being the product of pressures and affected areas.

Then force R is opposed by static force $F_G$ plus dynamic force $F_O$ plus static force $F_M$, which may be expressed as follows:

$$R = F_G + F_O + F_M$$

As stated hereinbefore $F_O$ is much smaller than $F_G$ and is smaller than $F_M$. By proper selection of bearing area proportional $F_M$ can be made to be as much as five to ten percent of $F_G$. Also, as stated hereinbefore, the pressure M or N decreases rapidly as the film thickness between cup-shaped surfaces 498 and 499 increases. This means that force $F_M$ is variable depending upon the film thickness between cup-shaped surfaces 498 and 499. Since positive displacement pumps 204 are of fixed capacity, this appreciable variation of force $F_M$ with film thickness effectively controls the axial position of bearing assembly BA and therefore the axial position of rotor 334 is also established.

The usefulness of variable force $F_M$ in establishing axial location of bearing assembly BA and rotor assembly 334 can best be appreciated when it is understood that gimbal assembly GA' and member 390 are structurally too weak and flexible to perform this function. Furthermore, there are no axial connecting means between ring 420 and plate 374 of bearing assembly BA.

In a similar manner the resultant force at G will cause an equal and opposite resultant force at J to act thus balancing the forces on either side of front plate 342. In turn resultant force at J is balanced by equal and opposite resultant force at I which is free to act on the rear plate 344 which member is not sensitive to distortion. Consequently all forces on members whose coaction can be adversely affected by distortion have been balanced so that these critical members will operate substantially without distortion.

If the axial thrust is assumed in the direction of arrow L, force Q would be created, which force is not of sufficient magnitude to cause distortion and therefore need not be considered.

Due to manufacturing tolerances and other reasons thrust collar 334 will run out or be misaligned so as not to be perpendicular with the axis of shaft 300 along the entire coacting surface of front plate 342. Runout or misalignment of thrust collar 334 can cause serious problems and/or breakdown of the bearing assembly if the predetermined minimum safe fluid film thickness between coacting faces 341 and 400 is not maintained over the entire surface. To overcome the problem of runout or misalignment of thrust collar 334 the bearing assembly BA is provided with considerable swivelable movement about the center $C_0$ described hereinbefore. This is so because of the spherical surface 498 of cup-shaped support member 390 which provides for such movement by the corresponding bearing faces 499 of projection 392 of the bearing assembly BA and the centers of radii of these surfaces being coincidental with the rotation center of gimbal assembly GA' and further such movement is accommodated by floating ring 420 as described hereinbefore. Therefore under both static and dynamic operating conditions a minimum safe fluid film thickness is continuously maintained.

FIGURE 20 illustrates the hydrostatic-hydrodynamic thrust bearing pressure restoring moment diagram. If the parallelism between the coacting faces of thrust collar 334 and front plate 372 of bearing assembly BA is disturbed because of runout or other reasons righting moments will immediately come into effect caused by the unbalance of the forces acting on said coacting faces. Thus on the parallelism being upset a large clearance LC is created at the lower end of the coacting faces of FIGURE 20. Correspondingly a small clearance SC would be formed at the upper end of the coacting faces. Thus, the dynamic pressures acting on the coacting faces of the thrust collar 334 and bearing assembly BA would be unequal along a plane passing through the axis of shaft 300. This is represented by the pressures shown at S' and S''. The static pressure T would remain equal on both sides of the axis of shaft 300, however, the dynamic pressure represented by S' would be smaller because of the larger clearance than the dynamic pressure S″, the ratio of dynamic pressures S″ and S′ being approximately inverse as the average film thickness above and below the shaft centerline squared, as those skilled in the art will recognize. Hence a righting moment would be generated which causes the bearing assembly BA to swivel thus bringing the moments generated by the dynamic pressures back into balance and enabling the coacting faces of front plate 342 of thrust collar 334 and front plate 372 of bearing assembly BA to re-establish a parallel relationship with each other. The restoring moments would act along the plane shown in FIGURE 20 and at 90° thereto such restoring moments would be equal to zero because the clearances there would be equal. On the moments coming back into balance with the coacting faces of the thrust collar 334 and bearing assembly BA re-establishing parallel relationship with each other, the clearances shown in FIGURE 20 as LC and SC would be equal to each other and would then represent equal the fluid film thickness.

In addition, moments generated by hydrostatic pressure forces will act to maintain a uniform film thickness as described hereinbefore.

The leakage of lubricating fluid across dams 416 and 414 of plate 372 of bearing assembly BA would result in a thermal increase in temperature of the fluid in accordance with Joules law. For oils the temperature rise is approximately about 0.8 degree Fahrenheit per 100 p.s.i. of pressure. At 500 p.s.i. supply pressure this temperature increase would be about 40° F. This temperature rise could cause some distortion of plate 372 of bearing assembly BA and plate 342 of thrust collar 334. To minimize this distortion created by the local thermal change of lubricating fluid, the local heat at dams 416 and 414 is conveyed to other parts of the bearing structure through conductivity of the metal components and a forced circulation of the lubricating fluid as described hereinafter. By rotation of thrust collar 334 on shaft 300 a pressure of lubricating fluid is generated by centrifugal force and this centrifugal pressure causes fluid to pass radially outward along grooves 370, radially outward along space 358 and through holes 360 toward circular groove 406 of plate 372 of bearing assembly BA. This oil then passes inwardly across faces 408 and 410 and grooves 402 of plate 372 and then through holes 362 of rotor front plate 342 to repeat the flow passage again and again. In flowing close to dams 414 and 416, heat is conveyed to other parts of the bearing structure assisting in maintaining a more uniform thermal distribution.

It should be recognized that the flow of oil as described above is superimposed upon the generally outward flow across dam 416 and inward flow across dam 414, the net effect of which is to distribute heat uniformly.

By these means the local distortion generated at dams 414 and 416 by heat conversion from pressure dissipation by Joules effect is minimizd to acceptable limits.

If rotational speeds are very low the means described hereinbefore which depend on centrifugal pressures produced by rotation will not be effective.

Since the temperature rise of the lubricating fluid results largely from degeneration of static pressure, thermal distortion at low speeds could cause significant distortion of the coacting faces unless special means is provided for removing the heat under these circumstances. Although such heat removal is not illustrated, such a system could be accomplished by supplying a separate oil cooling system which causes cool oil to pass through a circuit of passageways milled into plate 372 opposite face 341 and sealed by plate 384. A flexible connection to this circuit from a supply line passing through the wall of circular shell 314 will convey cooling oil delivered by a separate low pressure pump, the suction line of which is connected to reservoir 472. The cooling oil exhausts into space 468 where it combines with the lubricating oil circuit and returns to reservoir 472. This special cooling circuit is a simple design variation of the construction shown herein. The need for such a circuit is mentioned merely in recognition of the possible circumstances where this design variation might be necessary.

In the embodiment of the invention illustrated in FIGURE 21 a thrust bearing is disposed at the end of a shaft. Thus FIGURES 21 and 22 show a casing or support as at 600 which has a thrust bearing housing 602 connected to or formed integrally therewith. The housing 602 is a cup-shaped cylindrical member having its closed end 604 connected to the support 600 and its open end 606 remote from the connected end extending outwardly from the support 600, which open end receives a cover member 608, the entire assembly of the housing 602 and cover member 608 forms a thrust bearing chamber 610 inwardly thereof.

The support 600 and housing 602 have a common opening as at 612 through which a shaft 614 will extend so that the end of the shaft will terminate in the thrust bearing chamber 610.

A thrust collar 616 is connected to the end of the shaft 614 in the thrust bearing chamber 610 by any suitable means such as the threaded member 618 and the dowel pin 620 so that the thrust collar 616 will rotate, move and deflect with the end of the shaft 614 during the operation of the thrust bearing.

The thrust collar 616 will coact with a bearing cage assembly generally designated BC′ which is similar in construction to the bearing cage assembly BC shown in the FIGURE 3 form of the drawings. This bearing cage assembly BC′ is described more fully hereinafter.

As in the form of the invention shown in FIGURE 3, proper operation of the thrust bearing depends on maintaining at least a safe minimum fluid film thickness and accordingly a pumping system for delivering high pressure lubricating or bearing fluid to the thrust bearing parts in the thrust bearing chamber 610 is diagrammatically illustrated in FIGURE 21.

The pumping system 621 includes an inlet passage 622 which is in the front cover 608 and communicates with the high pressure side of the thrust bearing parts referred to hereinafter. The inlet 622 receives high pressure lubricating fluid from lines 624 and 626 which in turn are connected to the discharge of positive displacement pumps 628 and 630 which pumps have their suction inlet connected by lines 632 and 634 respectively to a lubricant fluid reservoir 636 which provides the source of lubricant fluid to be circulated and recirculated through the thrust bearing parts. Check valves 638 are disposed in lines 624 and 626 and strainers 640 may also be provided in lines 632 and 634, further lines 624 and 626 have bypass lines 624a and 626a having valves 625 therein, which bypass lines connect lines 624 and 626 respectively to line 644.

Fluid is returned from the low pressure side of the thrust bearing parts via the outlet passage 642 and return line 644 which communicates between the outlet 642 and the reservoir 636. Cooler 646 is disposed in line 644 to cool the returning fluid.

In operation, fluid from the reservoir 636 is drawn into the suction of the pumps 628 and 630 through suction lines 632 and 634 and discharged through lines 624 and 626 to the inlet passage 622. This pressure fluid is passed to the respective thrust bearing parts hereinafter described and will collect in the low pressure side of the bearing chamber 610 and return by differential pressure to the reservoir 636 via the outlet passage 642 and return line 644.

A ring seal as at 648 carried by the ring seal support 650 connected to the housing part 604 is provided to restrict leakage of lubricating fluid along the shaft 614 but such leakage which does escape past the ring seal will be collected in the collecting chamber 654 provided and formed outwardly thereof in the housing 602. This leakage fluid is subject to the pumping action of a slinger ring 656 in the chamber 654 which is mounted on and rotatable with the shaft 614 and will be returned by passage 658 in the housing 602 which communicates by a connecting conduit 660 with the reservoir 636 so that the leakage fluid can be recirculated with returning fluid from the thrust bearing chamber 610.

Since this form of the thrust bearing depends for its operation on the same coacting principles of force balance and restoring moment as above described, reference is now made to the bearing parts for accomplishing this operation.

Thus FIGURE 21 shows that the thrust bearing parts include two main assemblies; first the bearing cage assembly BC′, which includes a support assembly 662 and a bearing plate assembly 664 mounted in said support assembly 662 for universal or swivelable movement relative the thrust collar 4. Second, the transmitting and balancing arrangement for passing lubricating fluid under pressure from the inlet passage 622 to the face of the bearing plates coacting with the thrust collar and for balancing the pressure on either side of the bearing plate, critical to distortion, thus preventing distortion of these members.

The bearing plate assembly of the bearing cage assembly BC′ is substantially similar to the bearing plate assembly shown in the form of the invention illustrated in FIGURE 3. It includes a pair of associated bearing plates, front bearing plate 666 mounted on a front guide member 668 and rear bearing plate 670 mounted on a rear guide member 672. The front bearing plate 666 and rear bearing plate 670 are held in fixed predetermined spatial relationship by an annular spacer 674 when the elements are joined together by a plurality of connecting bolts 676 spaced circumferentially relative these parts and extending substantially parallel to the axis of the shaft 614 but just inwardly of the edge of the respective bearing plates 666, 670, guide members 668 and 672 and annular spacer 674, as shown in FIGURE 21.

The front bearing plate 666 coacts with the front side 678 of the thrust collar 616 when the axial thrust along the shaft 614 is in the direction shown by the arrow R and the rear bearing plate 670 coacts with the rear side 680 of the thrust collar 616 when the axial thrust along shaft 614 is in the direction shown by the arrow L. It will be understood, however, by those skilled in the art that the rear bearing plate could be a conventional Kingsbury type thrust bearing as is shown in FIGURE 25 without departing from the scope of the present invention.

In assembled position the bearing cage assembly is mounted about the thrust collar 616 as is indicated in FIGURE 21 where it is noted that the diameter of the inner wall 682 of the annular spacer 674 is greater than the outer periphery 684 of the thrust collar 616. Thus, an annular chamber or passage 686 is created between the spacer 674 and the outer periphery 684 of the thrust collar 616. In addition, the annular spacer 674 will be sized so that the fixed predetermined spatial relation between the faces 688 and 690 of the respective front bearing plate 666 and rear bearing plate 670 will be slightly greater than the width of the thrust collar 616. For example, on a thrust collar of 5″ the spacing of the bearing plate faces will be greater in width than the width of the thrust collar 616 by approximately $20 \times 10^{-3}$.

This bearing plate assembly 664 is so mounted by the support assembly 662 that this differential in width under static or dynamic conditions of operation will permit minute universal angular movement of the bearing cage assembly BC′ and its respective front and rear bearing plate 666 and 670 are so positioned relative to the front face 678 and the rear face 680 of the thrust collar 616, so as to provide clearance spaces therebetween, which spaces will under varying conditions vary in amount but the additive value of the two clearance spaces will at all times equal the total differential distance between the width of the thrust collar 616 and the total spatial distance that the bearing faces 688 and 690 of the bearing plates 666 and 670 are spaced relative each other. The minute universal angular movement of the bearing cage assembly BC′ occurs responsive to the thrust collar 616 runout. The runout or misalignment of thrust collar 616 results from its bearing faces not being perpendicular to the axis of shaft 614 and is usually due to operating or manufacturing tolerances.

Furthermore, by reason of this operative relation between the bearing plates 666 and 670 and thrust collar 616, a predetermined minimum fluid film thickness is maintained between the coacting faces of the respective bearing plate 666 or 670 and the thrust collar 616, whether under static or dynamic conditions, as was described in detail hereinbefore in connection with FIGURE 3.

Assuming the axial thrust is in a direction of the arrow R, fluid is introduced at the front face 678 of the thrust collar 616 for flow through clearance spaces, which usually will range from $1 \times 10^{-3}$ to $3 \times 10^{-3}$, formed between the front face 678 and coacting face 688 of the front bearing plate 666 and thence via the annular chamber 686 around to the rear side of thrust collar 616 to flow through the clearance spaces formed between the rear face 680 of the thrust collar 616 and the face 690 of the rear bearing plate 670. The clearance on the rear side of thrust collar 616 will be sufficiently great so as to create no appreciable restriction to the flow of fluid between the rear face 680 of thrust collar 616 and face 690 of the rear bearing plate 670. Thus, the fluid will flow in this clearance as if it were passing through a conduit.

Conversely, if the axial thrust is in the direction of the arrow L, a conduit-like passage will be created by the clearance between the front face 678 of the thrust collar 616 and face 688 of the front bearing plate 666. In this instance it will be the face 690 of the rear bearing plate 670 and the rear face 680 of the thrust collar 616 which coact under the load L.

The resultant thrust loads R and L, indicated by the solid and dotted arrows, respectively, cannot act at the same time but rather alternately. Further, the medium resultant thrust load R in this instance will be many times greater in magnitude than the maximum resultant thrust load L. Accordingly, the present illustration of the invention shown in FIGURE 21 is adapted to transmit only the force R, without creating distortion on critical members, to non-critical members which are free to distort, as was described in detail hereinbefore in connection with FIGURE 3. It is understood that if the thrust load L were large enough to cause distortion that the structure could be modified within the scope of the invention to transfer the distortion causing forces to non-critical members as was done with the thrust load R.

In order that the bearing cage assembly BC′ may operate under loads R or L the support assembly 662 must serve a dual function. First, it must accommodate the axial displacement of the bearing cage BC′ responsive to either direction of thrust R or L. Second, it must allow the bearing cage assembly BC′ to continuously adjust to the thrust collar 616 runout or misalignment.

To accomplish this, guide members 668 and 672 remote from the bearing plates 666 and 670 have an annular rocker ring 692 and 694, respectively, suitably connected thereto as by threaded means 696a, 696b and 698. Rocker rings 692 and 694 have annular projections 700 and 702 formed thereon extending in opposite directions away from thrust collar 616. These annular projections 700 and 702 have an outer surface 704 and 706, respectively, which is formed on a common spherical radii measured from the center of oscillation C″ as a result of the operative association of the spherical surfaces 704 and 706 with the support assembly 662.

The spherical surfaces 704 and 706 coact with the support assembly 662 for mounting the bearing plate assembly 664 which assembly includes an annular front support 708 and an annular rear support 710 each securely connected by any suitable means to the cover member 603 and the inner end of the housing 604 respectively as by threaded members 712 for the annular front support 708 and threaded members 714 for the annular rear support 710. The annular support members 708 and 710 will also have spherical surfaces 716 and 718 formed on the outer ends of annular projections 720 and 722, resspectively, which spherical surface of revolution is also on the spherical radii measured from the center of oscillation C" but of a greater radii than the spherical radii for the spherical surfaces 704 and 706 so that there is a spaced distance between these respective spherical surfaces.

In the spaced distance between the corresponding spherical surfaces 704, 716 and 706, 718, a plurality of spherical ball elements 724 and 726 are disposed in such a way that an angular rocking motion of bearing plate assembly 664 can be accommodated substantially without friction.

The front ball elements 724 are loosely disposed in spaced openings of retainer 766 which is attached to annular rocker ring 692 by threaded elements 696a. The rear ball elements 726 are similarly loosely held in fixed spatial relationship by retainer 768 which is attached to annular rear support 710 by threaded element 714.

In addition the ball rocker elements 724 and 726 have the capacity to provide for the slight axial movement of bearing cage assembly BC' when the axial load changes direction as for example from the direction shown by arrow R to that shown by arrow L, as was described in detail in connection with FIGURE 3.

The support assembly 662 provides for manufacturing tolerances by having shims 728 disposed between the front support 708 and close member 608.

In order to seal the high pressure bearing fluid entering the high pressure portion 610a of chamber 610 without interfering with the swivelable movement and slight axial movement of bearing cage assembly BC' sealing assembly 730 is provided and includes coacting annular sealing members 732 and 734 which sealingly engage each other at spherical edges 736 and 738 respectively. Member 732 is fixedly disposed against guide plate 668 and held in position by shrink fit on projection 740 formed thereon. To provide the necessary flexibility member 734 is floatingly disposed in recess 742 of cover 608 in sealed relationship therewith. Springs 744 engage the wall of cover member 608 and an annular outwardly extending flange 746 to yieldably urge member 734 into sealed engagement with member 732. The pressure fluid will pass through spaces 748 formed between ball rocker elements 724 but only an extremely small amout thereof will pass between spherical edges 736 and 738 to enter low pressure portion 610b of chamber 610 and then only after the pressure has been broken down to become low pressure fluid. The radii of spherical edges 736 and 738 is taken from the center of oscillation C".

Anti-rotational pin 750 is sealingly disposed through housing 602 and extends into groove 752 of spacer 674 to prevent bearing cage assembly BC' from rotating.

Front face 688 of front bearing plate 666 as shown in FIGURES 21 and 22 has radially extending grooves 754 extending from its inner end to communicate with annular groove 756 adjacent dam 758. The pads 760 as illustrated in FIGURES 22 and 23 have tapered sections 762 on either side thereof extending from grooves 754 which sections would enable pads 760 to create a fluid film whether shaft 614 were rotated clockwise or counterclockwise by permitting fluid from grooves 754 to be passed therefrom and "dragged" across tapered sections 762 and pads 760 in a manner described hereinbefore.

Rear face 680 of rear bearing plate 670 as shown in FIGURE 21 will have the fluid pass from space 686 into radial grooves 764 which communicate therefrom into space 681. Pads 770 are formed between grooves 764 and extend therebetween.

Bearing fluid will flow, during operation, over dam 758 as described hereinbefore.

FIGURE 24 shows a force diagram of typical pressures acting on the components and is substantially identical to that shown in FIGURE 9. Accordingly the description and explanation of operation will not be repeated but reference may be made to the subject matter of FIGURE 9 wherein all that need be done for full understanding is substitute the unprimed letter with the primed letter; for example, in referring from FIGURE 24 to FIGURE 9 the A (of FIGURE 9) would become the A' (of FIGURE 24). D' and E' represent the resultant of the pressures shown in step configuration in the drawings.

In FIGURE 25 like numerals represent like parts shown hereinbefore in FIGURE 21 and unless these parts have been substantially modified they will not be described again. Of course the operation is substantially the same as described hereinbefore.

Since Kingsbury type thrust bearings 772 are used bearing cage assembly BC' has been replaced by bearing assembly BA' which includes a support assembly 774 and a bearing plate assembly 776 mounted for universal movement therein.

Bearing plate assembly 776 includes a front bearing plate 666a which has a groove 752a into which is disposed an anti-rotation pin 750a. Front face 688 of plate 666a will coact with front face 678 of thrust collar 616 in a manner described hereinbefore. Rim 778 is formed on the outer periphery of the front plate 666a for purposes described hereinafter. Front bearing plate 666a is mounted on front guide plate 668 which in turn has an annular rocker ring 692 mounted thereon.

Housing 602a is similar to housing 602 except that it has outlet passage 642a communicating with passage 642 and has an annular ridge 780 on which is disposed mounting balls 782. Balls 782 are disposed between rim 778 and annular retainer 784 as shown in FIGURES 25 and 26 which has notches for their circumferential positioning. Balls 782 support the bearing plate assembly and will permit universal movement thereof because the radii of surfaces 779 and 780 are taken from the center of oscillation $C'_0$.

The universal movement of bearing assembly BA' takes place about its center of oscillation $C'_0$ from which point the radii is measured to form the common spherical surfaces 704a of the rocker ring 692 and 716a of the support member 708 between which is disposed ball rocker elements 724 for purposes described hereinbefore.

The pumping system 621 is substantially the same as that described in connection with FIGURE 21 except that after the bearing fluid flows across the coacting bases 688 and 678 of the front plate 666a and thrust collar 616 it is out of the high pressure portion 610a of chamber 610 and in the low pressure portion 610b thereof. Once in low pressure portion 610b the fluid will pass between coacting faces 680 of collar 616 and 786 of bearing 772 and enter space 787 which leads to outlet passage 642.

Either force R or force L will act along shaft 614 and while no pressure diagram is shown it is apparent from previous description and drawings that the pressure diagram of FIGURE 9 could be generally applicable.

For certain applications it may be desirable to replace guide plate 668, rocker ring 692, ball rocker elements 724 and support assembly 774 or 662. This may be done, as shown in FIGURE 27, by a single swivelable support member 800. Member 800 has an annular projection 802 which extends into recess 804 of front bearing plate 666a. Guide wall 806 extends radially outwardly from projection 802 and serves to fixedly connect the front bearing plate 666a thereto by suitable means such as threaded members 808a and 808b thus forming bearing assembly BA". At the outermost end of guide wall 806 an annular arcuate flange 810 is formed extending in the direction remote from the center of oscillation $C''_0$ at a constant spherical radii thereto so that the spherical surface 812 is formed on the outer circumference of flange 810. Annular housing support member 814 has a correspondingly shaped spherical surface 816 which sealingly engages spherical surface 812 whereby bearing assembly BA" is permitted swivelable movement about center of oscillation $C''_0$ responsive to thrust collar 616 runout. Support member 814 is suitably connected to cover member 608a as by threaded means 818 and has a small air vent passage 820 at its uppermost end which voids compressible gases to the low pressure chamber portion 610b. Hollow annular axially-extending projection 822 terminates in a front member 824 formed integral therewith. Front member 824 has its outer surface 826 spherically formed at a fixed radial distance from the center of oscillation $C''_0$. Surface 826 will locate bearing assembly BA" with respect to cover 608a and permit swivelable movement of bearing assembly BA" as it engages balls 828 suitably mounted between member 830 and annular member 832, which members are connected to cover member 608a by the threaded means 834a and 834b respectively. Support member 800 has web members 836 which stiffen said member. Further, front bearing plate 666a is supported by balls 782 held in position by retainer 784 as described hereinbefore.

High pressure bearing fluid from pumping system 621 (not shown in FIGURE 27) will enter high pressure chamber portion 610a through passage 622 and pass into the hollow annular projection 822 through holes 838 therein. Once inside projection 822 the high pressure fluid will flow between the coacting faces of the front bearing plate 666a and thrust collar 616 as was fully described hereinbefore. Leakage of oil at surface 816 will be prevented by an annular O-ring seal 817.

It will be understood that various changes in the details, materials and arrangement of parts which have been herein described and illustrated in order to explain the nature of the invention may be made by those skilled in the art within the principles and scope of the invention as expressed in the claims.

What is claimed is:
1. A thrust bearing effective for balancing axial forces exerted along a shaft under static and dynamic operating conditions of said shaft comprising,
  (a) a housing about the shaft,
  (b) a thrust collar having at least one bearing face disposed in said housing and mounted on and rotatable with the shaft,
  (c) a stator assembly in said housing having at least one bearing face disposed in predetermined spaced relation to and coacting with the bearing face of the thrust collar,
  (d) passage means in said housing connected at one end to a source of pressure fluid and disposed to deliver said pressure fluid between the coacting thrust collar bearing face and stator assembly bearing face,
  (e) means on at least one bearing face and operatively engaging the other bearing face to force pressure fluid therebetween to exert an axial force against the bearing face of the thrust collar equal and opposite to the axial force exerted along the shaft and against the bearing face of the stator assembly equal and in the same direction as the axial force exerted along the shaft,
  (f) means in said housing forming a substantially fluid tight chamber having one side of predetermined area formed on the side of the stator assembly remote from the bearing face side, and having at least one side in communication with the wall of the housing,
  (g) said chamber having pressure fluid therein at all times and in continuous communication with said passage means to permit the equivalent forces acting in said pressure fluid at the face of the thrust collar and the face of the stator assembly to be distributed uniformly to balance the forces across the stator assembly and to simultaneously transmit and expend said forces against the wall of the housing,
  (h) and means in operative engagement with the thrust collar and the stator assembly to permit slight axial displacement and swivelable movement of said stator assembly responsive to thrust collar movement and run-out.

2. A thrust bearing effective for balancing axial forces exerted along a shaft under static and dynamic operating conditions of said shaft comprising,
  (a) a housing about the shaft,
  (b) a thrust collar having at least one bearing face disposed in said housing and mounted on and rotatable with the shaft,
  (c) a stator assembly in said housing having at least one bearing face disposed in predetermined spaced relation to and coacting with the bearing face of the thrust collar,
  (d) passage means in said housing connected at one end to a source of pressure fluid and disposed to deliver said pressure fluid between the coacting thrust collar bearing face and stator assembly bearing face,
  (e) means on at least one bearing face and operatively engaging the other bearing face to force pressure fluid therebetween to exert an axial force against the bearing face of the thrust collar equal and opposite to the axial force exerted along the shaft and against the bearing face of the stator assembly equal and in the same direction as the axial force exerted along the shaft,
  (f) means in said housing forming a substantially fluid tight chamber having one side of predetermined area formed on the side of the stator assembly remote from the bearing face side, and having at least one side in communication with the wall of the housing,
  (g) said chamber having pressure fluid therein at all times and in continuous communication with said passage means to permit the equivalent forces acting in said pressure fluid at the face of the thrust collar and the face of the stator assembly to be distributed uniformly to balance the forces across the stator assembly and to simultaneously transmit and expend said forces against the wall of the housing,
  (h) and means for mounting the stator assembly in said housing to permit axial movement and swivelable movement responsive to corrective moments produced by self-generating force difference acting to maintain the bearing face of the stator substantially parallel to the bearing face of the thrust collar so that thrust collar movement and run-out and shift in shaft alignment will be accommodated at all times.

3. A thrust bearing effective for balancing axial forces exerted along a shaft under static and dynamic operating conditions of said shaft comprising,
  (a) a housing about the shaft,
  (b) a thrust collar having at least one bearing face disposed in said housing and mounted on and rotatable with the shaft,
  (c) a stator assembly in said housing having at least one bearing face disposed in predetermined spaced relation to and coacting with the bearing face of the thrust collar,
  (d) passage means in said housing connected at one end to a source of pressure fluid and disposed to deliver said pressure fluid between the coacting thrust collar bearing face and stator assembly bearing face,
  (e) means on at least one bearing face and operatively engaging the other bearing face to force pressure fluid therebetween to exert an axial force against the bearing face of the thrust collar equal and opposite to the axial force exerted along the shaft and against the bearing face of the stator assembly equal and in the same direction as the axial force exerted along the shaft, (f) means in said housing forming a substantially fluid tight chamber having one side of predetermined area formed on the side of the stator assembly remote from the bearing face side, and having at least one side in communication with the wall of the housing, (g) said chamber having pressure fluid therein at all times and in continuous communication with said passage means to permit the equivalent forces acting in said pressure fluid at the face of the thrust collar and the face of the stator assembly to be distributed uniformly to balance the forces across the stator assembly and to simultaneously transmit and expend said forces against the wall of the housing, (h) means on at least one bearing face and operatively connected to the other bearing face to create hydrostatic restoring moments of force having a net moment difference to maintain at all times substantial parallelism between the bearing face of the stator assembly relative the bearing face and the thrust collar, (i) and means in operative engagement with the stator assembly to permit slight axial displacement or swivelable movement of said stator assembly responsive to thrust collar movement and run-out.

4. A thrust bearing effective for balancing axial forces exerted along a shaft under static and dynamic operating conditions of said shaft comprising, (a) a housing about the shaft, (b) a thrust collar having at least one bearing face disposed in said housing and mounted on and rotatable with the shaft, (c) a stator assembly in said housing having at least one bearing face disposed in predetermined spaced relation to and coacting with the bearing face of the thrust collar, (d) passage means in said housing connected at one end to a source of pressure fluid and disposed to deliver said pressure fluid between the coacting thrust collar bearing face and stator assembly bearing face, (e) at least one annular dam means on one bearing face operatively engaging the other bearing face to force pressure fluid therebetween to exert an axial force against the bearing face of the thrust collar equal and opposite to the axial force exerted along the shaft and against the bearing face of the stator assembly equal and in the same direction at least in one of the directions the axial force is exerted along the shaft, (f) a plurality of pad means for the bearing face having the annular dam means disposed inwardly of said dam means, (g) radial grooves in the bearing face having the dam means between adjacent pads to receive pressure fluid from the passage means and distribute the same to said pad means whereby said pad means will produce swivelable movements of the stator assembly from the self generated force differences between the pads and the other bearing face, to maintain the bearing face of the stator assembly in substantial parallelism with the bearing face of the thrust collar responsive to thrust collar run-out, (h) means in said housing forming a substantially fluid tight chamber having one side of predetermined area formed on the side of the stator assembly remote from the bearing face side, and at least one side in communication with the wall of the housing, (i) said chamber having pressure fluid therein at all times and in continuous communication with said passage means to permit the equivalent forces acting in said pressure fluid at the face of the thrust collar and the face of the stator assembly to be distributed uniformly to balance the forces across the stator assembly and to simultaneously transmit and expend said forces against the wall of the housing, (j) and means operatively connected with the stator to permit slight axial displacement and take up said swivelable movement of said stator assembly generated responsive to thrust collar movement and shifts in shaft misalignment.

5. In a thrust bearing as claimed in claim 3 wherein the means in engagement with the stator assembly to permit slight axial displacement and swivelable movement includes, (a) a stator support assembly connected to said housing, (b) said stator support assembly having a relatively frictionless support surface of spherical configuration with a center on the axis of the shaft, (c) said stator assembly having a relatively low frictional surface of spherical configuration coincident with the contour of the support surface of the support assembly and disposed in assembled position to coact with the support surface of the support assembly.

6. In a thrust bearing as claimed in claim 3 wherein means are provided to adjustably position the stator support assembly and the stator assembly to establish the predetermined spaced relation of the bearing face of the support assembly to the bearing face of the thrust collar.

7. In a thrust bearing as claimed in claim 3 wherein the passage means includes, (a) gimbal means sealingly disposed in the housing to act as a conduit for pressure fluid, (b) transverse passages formed in said stator assembly having one end communicating with the bearing face of the stator assembly inwardly of the pad means and the other end coacting with the chamber and the gimbal means.

8. In a thrust bearing as claimed in claim 7 wherein the gimbal means is mounted in the chamber, one end of said gimbal means connected to the side of said stator assembly remote from the bearing face of the stator assembly, the other end of said gimbal means connected to the side of said housing, and means providing a seal at each of said points of connection, and inlet means to conduct said gimbal means to the source of pressure fluid.

9. In a thrust bearing as claimed in claim 8 wherein the side of the stator assembly remote from the bearing face of the stator assembly is provided with a recess, said gimbal means disposed in sealing engagement in the gimbal means and defining the limits of the side wall of the chamber.

10. In a thrust bearing as claimed in claim 8 wherein, (a) the spherical surface of the stator support assembly has an annular groove connected to the source of pressure fluid to distribute the same therein, (b) means for returning said pressure fluid to said source whereby said pressure fluid will act to produce a fluid film of predetermined thickness between the spherical surface of the stator support assembly and the spherical surface of the stator assembly.

11. A thrust bearing effective for balancing axial forces exerted along a shaft under static and dynamic operating conditions of said shaft comprising, (a) a housing about the shaft, (b) a thrust collar having a front bearing face and a rear bearing face disposed in said housing and mounted on and rotatable with the shaft, (c) a non-rotatable bearing cage assembly in said housing disposed to coact with the thrust collar, (d) said bearing cage having a pair of bearing plates held in predetermined spaced relation from each other a distance slightly greater than the thickness of said thrust collar whereby in assembled position at said bearing plates are disposed in predetermined spaced relation to the respective front bearing face and rear bearing face of the thrust collar, (e) passage means in said housing connected at one end to a source of pressure fluid and disposed to deliver said pressure fluid between the coacting bearing faces, (f) means on at least one bearing plate and operatively connected to the coacting bearing face of the thrust collar to force said pressure fluid to exert an axial force against the bearing face of the thrust collar equal and opposite to the axial force exerted along the shaft and against the bearing plate of the bearing cage assembly equal and in the same direction as said axial force exerted along the shaft, (g) means in said housing forming a substantially fluid tight chamber having one side of predetermined area formed on the side of the bearing cage assembly remote from at least one bearing plate, and having at least one side in communication with the wall of the housing, (h) said chamber having pressure fluid therein at all times and in continuous communication with said passage means to permit the equivalent forces acting in said pressure fluid at the bearing face of the thrust collar and the bearing plate of the bearing cage assembly to be distributed uniformly to balance the forces across the bearing cage assembly and to simultaneously transmit and expand said forces against the wall of the housing, (i) means on at least one bearing plate and operatively connected to the bearing face of the thrust collar to create hydrostatic restoring movements of force having a net moment difference to maintain at all times substantial parallelism between at least one of the bearing plates of the bearing cage assembly and the active bearing face of the thrust collar, (j) and bearing cage assembly support means fixedly connected to the housing and operatively engaging the bearing cage assembly to permit limited axial displacement and swivelable movement of the bearing cage assembly responsive to the transmitted thrust collar restoring moments and the shift in shaft alignment.

12. In a thrust bearing as claimed in claim 11 wherein the bearing cage assembly support means includes,
    (a) means for connecting the bearing cage in adjusted position to said housing,
    (b) said support means having a spherical support surface about a center on the axis of the shaft,
    (c) and spherical surface means on the bearing cage assembly to coact with the spherical surface of the support means.

13. In a thrust bearing as claimed in claim 12 wherein the radii from the center of oscillation of the coacting spherical surface of the bearing cage assembly and the spherical surface of the support means are equal.

14. In a thrust bearing as claimed in claim 12 wherein the radii from the center of oscillation of the coacting spherical surface of the bearing cage assembly and the spherical surface of the stator means are unequal.

15. In the thrust bearing as claimed in claim 3 wherein,
    (a) a Kingsbury type bearing is formed in the housing on the side of the thrust collar remote from the stator assembly,
    (b) the Kingsbury type bearing and the stator assembly in predetermined axially spaced relationship so that only one bearing face in the thrust collar will act depending on the direction of axial force exerted along the shaft,
    (c) said Kingsbury type bearing normally out of engagement with the thrust collar and in operation when the axial face acting along the shift shaft to act in the direction for engagement between the thrust collar and the Kingsbury type bearing formed in the housing.

16. In a thrust bearing as claimed in claim 15 wherein, a journal bearing is disposed to support the shaft on the side of the thrust collar remote from the end of the shaft and in operative relation with the Kingsbury type bearing.

17. In a thrust bearing as claimed in claim 3 wherein,
    (a) said thrust collar includes at least one bearing plate having the bearing face of the thrust collar on one side thereof,
    (b) chamber means in said thrust collar having one side formed by the side of said bearing plate remote from the bearing face side,
    (c) and passage means connected to said chamber to permit the pressure fluid acting between the bearing face of the thrust collar and the bearing face of the stator assembly to exert a pressure in the bearing plate side of the chamber equal and opposite to that exerted on the bearing face side of the bearing plate to prevent distortion of the bearing face of the thrust collar.

18. In a thrust bearing as claimed in claim 17 wherein the bearing plate is relatively thin with respect to the remaining portion of the thrust collar.

19. In a thrust bearing as claimed in claim 17 wherein the bearing plate is in fixed and tightly fitting relationship to the remainder of the thrust collar at its inner periphery and relatively movable at its outer periphery whereby during operation the bearing plate will remain free of distortion from the pressure of fluid acting thereon.

20. In a thrust bearing as claimed in claim 3 wherein,
    (a) the thrust collar includes at least one thin member and at least one thicker member disposed in spaced relation to form a chamber therebetween,
    (b) said thin member having the bearing face of the thrust collar on one side and forming one side of the chamber on the side remote therefrom,
    (c) passage means on said thin member to pass the pressure of the fluid which is acting on the bearing face of the thin plate to said chamber formed by the thin member and the thick member whereby the forces acting on said thin member will be balanced and simultaneously expended against the thicker member of the thrust collar,
    (d) said thick member having a recess formed therein,
    (e) the thin member mounted in said recess to form said chamber and disposed for movement relative said thick member at the outer periphery thereof,
    (f) and seal means between the outer periphery of the thin member and the recess.

21. In a thrust bearing as claimed in claim 20 wherein means is provided on the thin member to prevent distortion from heat including,
    (a) at least one inner passage and one outer passage through said thin member,
    (b) and spaced radially extending passages on the side of the thin member remote from the bearing face side to coact with the inner passage and outer passage to circulate pressure fluid freely at all times that the thrust bearing is in operation.

References Cited by the Examiner

UNITED STATES PATENTS

| 611,984 | 10/98 | Wright | 308—9 |
| 2,037,326 | 4/36 | Howarth | 308—160 |
| 2,054,219 | 9/36 | Howarth | 308—160 |
| 2,155,455 | 4/39 | Thoma | 308—160 |

ROBERT C. RIORDON, *Primary Examiner.*

FRANK R. SUSKO, *Examiner.*